United States Patent
Gupta et al.

(10) Patent No.: US 11,857,998 B2
(45) Date of Patent: Jan. 2, 2024

(54) COMPOSITION AND METHOD FOR A MICROTEXTURE HYDROPHOBIC OR SUPERHYDROPHOBIC COATING

(71) Applicant: University of Virginia Patent Foundation, Charlottesville, VA (US)

(72) Inventors: Mool C. Gupta, Keswick, VA (US); Alan T. Mulroney, Marshall, VA (US); Chao Qin, Charlottesville, VA (US)

(73) Assignee: University of Virginia Patent Foundation, Charlottesville, VA (US)

(\*) Notice: Subject to any disclaimer, the term of this patent is extended or adjusted under 35 U.S.C. 154(b) by 69 days.

(21) Appl. No.: 16/952,850

(22) Filed: Nov. 19, 2020

(65) Prior Publication Data
US 2021/0154700 A1 May 27, 2021

Related U.S. Application Data

(60) Provisional application No. 62/939,372, filed on Nov. 22, 2019.

(51) Int. Cl.
*B05D 5/08* (2006.01)
*B05D 1/12* (2006.01)
(Continued)

(52) U.S. Cl.
CPC ............... *B05D 5/08* (2013.01); *B05D 1/12* (2013.01); *C09D 5/033* (2013.01); *C09D 7/65* (2018.01);
(Continued)

(58) Field of Classification Search
CPC . B05D 5/08; B05D 1/12; B05D 7/546; B05D 1/06; B05D 3/02; B05D 2504/00;
(Continued)

(56) References Cited

U.S. PATENT DOCUMENTS

| 4,032,090 A | 6/1977 | Thornton-Trump |
| 7,434,793 B2 | 10/2008 | Kunath et al. |

(Continued)

FOREIGN PATENT DOCUMENTS

| EP | 1849843 | 9/2015 |
| EP | 2632612 | 5/2016 |

(Continued)

OTHER PUBLICATIONS

Caffrey, Paul O., et al., "Electrically conducting superhydrophobic microtextured carbon nanotube nanocomposite", Applied Surface Science, Sep. 30, 2014 (available online Jun. 17, 2014), pp. 40-45, vol. 314.

(Continued)

*Primary Examiner* — William P Fletcher, III
(74) *Attorney, Agent, or Firm* — Robert J. Decker

(57) ABSTRACT

A composition for a microtexture hydrophobic or superhydrophobic coating. The microtexture coating includes a coating layer disposed on a substrate with hydrophobic or superhydrophobic particles dispersed on top of or partially embedded in the coating layer to form an outer layer. The outer layer exhibits water repellant properties. Use of the microtexture coating permits large scale, durable hydrophobic or superhydrophobic coating applications. A method of applying a coating to a substrate creating a hydrophobic or superhydrophobic surface that includes applying a polymer material or an adhesive material to the substrate creating a polymer coating layer having a top surface; initially curing the applied coating layer for a specified amount of time allowing the coating layer to partially cure; and applying a solution, at a specified velocity, containing hydrophobic particles or superhydrophobic particles on top of the partially cured coating layer.

20 Claims, 16 Drawing Sheets

(51) Int. Cl.
*C09D 5/03* (2006.01)
*C09D 7/40* (2018.01)
*C09D 7/65* (2018.01)
*B82Y 40/00* (2011.01)
*B82Y 30/00* (2011.01)

(52) U.S. Cl.
CPC .............. *C09D 7/67* (2018.01); *C09D 7/68* (2018.01); *C09D 7/69* (2018.01); *B82Y 30/00* (2013.01); *B82Y 40/00* (2013.01)

(58) Field of Classification Search
CPC . C09D 5/033; C09D 7/65; C09D 7/67; C09D 7/68; C09D 7/69; C09D 5/1681; B82Y 30/00; B82Y 40/00
See application file for complete search history.

(56) References Cited

U.S. PATENT DOCUMENTS

| | | | |
|---|---|---|---|
| 8,424,200 | B2 | 4/2013 | Gupta et al. |
| 8,753,990 | B2 | 6/2014 | Gupta et al. |
| 8,846,551 | B2 | 9/2014 | Gupta et al. |
| 9,637,658 | B2 | 5/2017 | Nowak et al. |
| 10,131,086 | B2 | 11/2018 | Gupta et al. |
| 10,201,947 | B2 | 2/2019 | Gupta et al. |
| 10,584,260 | B2 | 3/2020 | Nowak et al. |
| 10,619,057 | B2 | 4/2020 | Nowak et al. |
| 2010/0143744 | A1 | 6/2010 | Gupta et al. |
| 2014/0273535 | A1 | 9/2014 | Gupta et al. |
| 2019/0010335 | A1* | 1/2019 | Bovero .................. C09D 5/084 |
| 2019/0023830 | A1 | 1/2019 | Nowak et al. |
| 2019/0176188 | A1 | 6/2019 | Rodriguez et al. |
| 2020/0181427 | A1 | 6/2020 | Nowak et al. |

FOREIGN PATENT DOCUMENTS

| | | |
|---|---|---|
| WO | 2008/045109 | 4/2008 |
| WO | 2008/091242 | 7/2008 |
| WO | 2008/127807 | 10/2008 |

OTHER PUBLICATIONS

Mulroney, Alan T., et al., "Low ice adhesion surfaces using microtextured hydrophobic tapes and their applications in refrigeration systems", Surface & Coatings Technology, Oct. 15, 2018 (available online Jul. 26, 2018), pp. 108-114, vol. 351.

Qin, Chao (Chris), et al., "Anti-icing epoxy resin surface modified by spray coating of PTFE Teflon particles for wind turbine blades", Materials Today Communications, Mar. 2020 (available online Nov. 12, 2019), vol. 22, 7 pages (100770).

Yang, Shuqing, et al., "Research on the icephobic properties of fluoropolymer-based materials", Applied Surface Science, Mar. 15, 2011 (available online Jan. 5, 2011), pp. 4956-4962, vol. 257, No. 11.

* cited by examiner

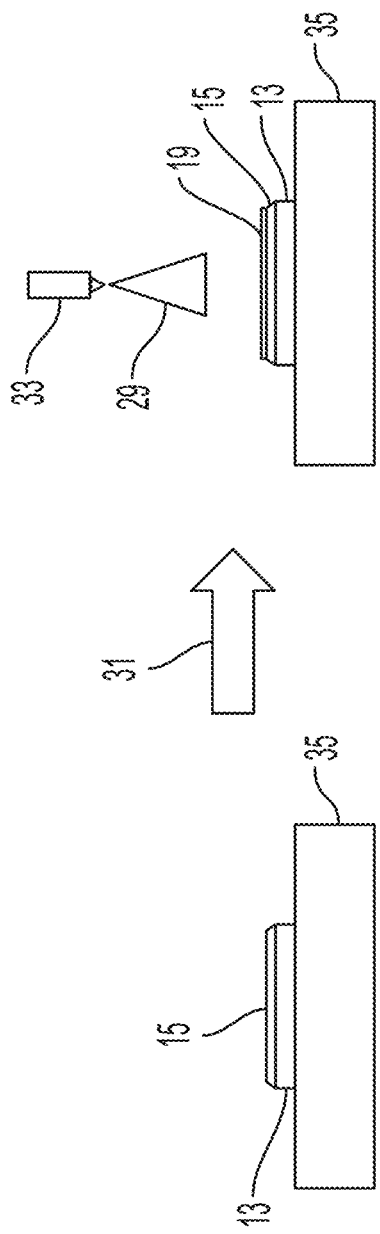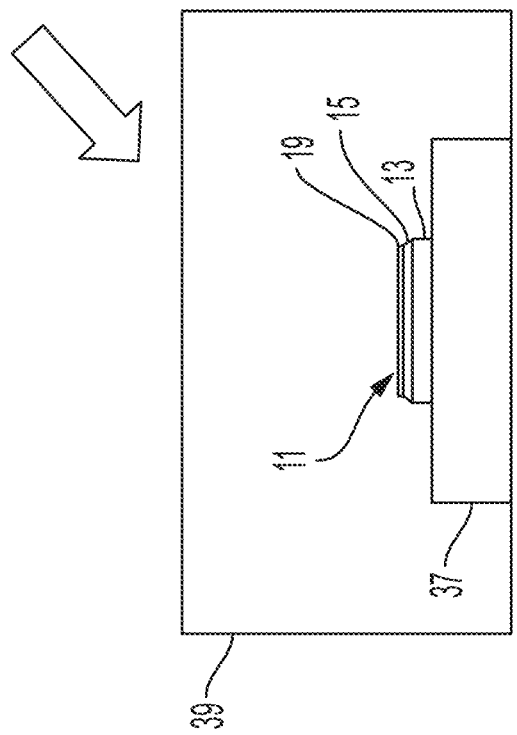

COMPOSITION AND METHOD FOR A MICROTEXTURE HYDROPHOBIC OR SUPERHYDROPHOBIC COATING

CROSS REFERENCE TO RELATED APPLICATIONS

The present application claims benefit of priority under 35 U.S.C. § 119 (e) from U.S. Provisional Application Ser. No. 62/939,372, filed Nov. 22, 2019, entitled "Anti-Icing Epoxy Resin Surface Modified by Spray Coating of PTFE Teflon Particles for Wind Turbine Blades"; the disclosure of which is hereby incorporated by reference herein in its entirety.

FIELD OF INVENTION

The present invention relates generally to a method for making microtexture hydrophobic or superhydrophobic coatings and a composition of hydrophobic or superhydrophobic microtexture coatings. More particularly, the present disclosure relates to microscale/nanoscale roughness (microtexture) to surfaces that can create hydrophobic superhydrophobic surfaces that can prevent ice accumulation and other material accumulation.

BACKGROUND

The accumulation of liquid water and ice on surfaces is a challenge for many industries. Ice accumulation on wind turbine blades can create weight imbalances and distort the aerodynamic properties of the blades. Ice buildup can lead to mechanical vibration, efficiency loss, and increased downtime for repairs.

Ice accumulation presents a problem for airplanes. Ice on airplane wings affects aerodynamics, negatively impacts fuel efficiency, and presents a serious safety risk. At present, aircraft must be de-iced and have temporary anti-icing coatings applied to the wings to avoid this issue. Still, these solutions are short term and require considerable maintenance and personnel.

Windows and solar panels also suffer from similar icing and water issues. Solar panels with accumulated ice have decreased energy generation and require cleaning and repair. A permanent hydrophobic coating on these surfaces could drastically reduce the maintenance needed to maintain peak efficiency.

An alternative approach in development to combat this problem is the generation of nanoscale roughness on the surface of low surface energy polymers. This process is limited by the number of materials that will accept such roughness and its inability to cover effectively large or curved surfaces. Another approach consists of mixing multiple types of hydrophobic particles and metal oxides in epoxy and applying it to a surface. This process also creates an object with a hydrophobic surface.

There is a need to simplify the creation of hydrophobic surfaces by using fewer inputs, and using a process applicable to large surface areas. Aspects of various embodiments of the present invention disclosed herein address, but are not limited thereto, all these issues. An aspect of an embodiment uses a single type of hydrophobic or superhydrophobic particle, applied in a single step, and has the ability to be spread on any size or curved surface.

SUMMARY OF ASPECTS OF EMBODIMENTS OF THE PRESENT INVENTION

In the present disclosure, a created hydrophobic surface is identified as a possible candidate for large-scale surface applications because the procedures are widely used for commercial paints on curved surfaces. The use of a thin layer of hydrophobic or superhydrophobic particles can create an outer layer which can modify surface wetting and anti-icing behavior. [See Mulroney, A. T., Kessler, E. D., Combs, S. and Gupta, M. C., 2018, Low ice adhesion surfaces using microtextured hydrophobic tapes and their applications in refrigeration systems, *Surface and Coatings Technology*, 351, pp. 108-114, of which is hereby incorporated by reference herein in its entirety.] The hydrophobic or superhydrophobic particles can be applied to a polymer or adhesive material coating layer on an existing substrate. To increase the strength of adhesion between the outer layer and coating layer, a final cure was performed. In this present study, the wetting analysis was performed, involving measuring the CA, ROA, and ice detachment pressure. Mechanical ice removal was identified as a common method for measuring ice detachment pressure. Mechanical removal requires physical access to the surface and introduced the greatest durability concerns.

An aspect of an embodiment of the present invention includes the prevention of icing and removal of ice (or other material) in such applications like wind turbine blades or other devices, systems, and environments. For example, ice on wind turbine rotors creates weight imbalances and fundamentally alters the object's aerodynamics. This can lead to unwanted vibrations, efficiency losses and increased repair costs in many types of engineering applications.

An aspect of an embodiment of the present invention provides the introduction of microscale/nanoscale roughness (microtexture) to surfaces that creates hydrophobic and/or superhydrophobic surfaces that can prevent ice accumulation (as well as the accumulation of other materials). Ice detachment strength is one way to measure the success of these techniques. In an approach, some polymers that may be used in the technique are PTFE (polytetrafluoroethylenes) and PDMS (poldydimethylsiloxanes). These compounds aid in forming the roughness and possess properties themselves which reduce the ability of liquid to make contact with the surface, also known as wetting.

An aspect of an embodiment of the present invention provides, but not limited thereto, a method of applying a coating to a substrate creating a hydrophobic or superhydrophobic surface. The method may comprise: applying a polymer material or an adhesive material to the substrate creating a polymer coating layer having a top surface; initially curing the applied coating layer for a specified amount of time allowing the coating layer to partially cure; and applying a solution, at a specified velocity, containing hydrophobic particles or superhydrophobic particles on top of the partially cured coating layer. Still referring to the method, the individual hydrophobic particles or superhydrophobic particles are: a) partially embedded into the partially cured coating layer while also being partially exposed above the top surface of the partially cured coating layer to form an outer layer, b) fixedly disposed in contact with the top surface of the partially cured coating layer without being embedded within the partially cured coating layer to form the outer layer, c) optionally, fixedly disposed in contact with the outer layers of 'a' and/or 'b' without being in contact with the partially cured coating layer to form the outer layer, and d) optionally, entirely embedded in the partially cured coating layer apart from the outer layer. Still referring to the method, the method comprises subsequently curing the substrate, the partially cured coating layer, the outer layer, at a specified temperature for a specified period of time, wherein the outer layer exhibits hydrophobic properties or superhydrophobic properties.

An aspect of an embodiment of the present invention provides, but not limited thereto, a composition configured to be disposed on a substrate. The composition may comprise: a coating layer disposed on the substrate, wherein the coating includes a top surface; an outer layer disposed on the coating layer; wherein the outer layer comprises substantially uniform distributed hydrophobic particles or superhydrophobic particles. Further, the individual the hydrophobic particles or superhydrophobic particles are: a) partially embedded into the partially cured coating layer while also being partially exposed above the top surface of the partially cured coating layer to form the outer layer, b) fixedly disposed in contact with the top surface of the partially cured coating layer without being embedded within the partially cured coating to form the outer layer, c) optionally, fixedly disposed in contact with the outer layers of 'a' and/or 'b' without being in contact with the partially cured coating layer to form the outer layer, and d) optionally, entirely embedded in the partially cured coating layer apart from the outer layer and wherein the outer layer exhibits hydrophobic properties or superhydrophobic properties.

An aspect of an embodiment of the present invention provides, but not limited thereto, a composition and method for a microtexture hydrophobic or superhydrophobic coating. The microtexture coating includes a coating layer disposed on a substrate with hydrophobic or superhydrophobic particles dispersed on top of or partially embedded in the coating layer to form an outer layer. The outer layer exhibits water repellant properties. Use of the microtexture coating permits large scale, durable hydrophobic or superhydrophobic coating applications. The microtexture coating is a useful for application on wind turbines, airplanes, solar panels, windows, or cooling systems.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It should be appreciated that any of the components or modules referred to with regards to any of the present invention embodiments discussed herein may be integrally or separately formed with one another. Further, redundant functions or structures of the components or modules may be implemented. Moreover, the various components may be communicated locally and/or remotely with any user/operator/customer/client or machine/system/computer/processor. Moreover, the various components may be in communication via wireless and/or hardwire or other desirable and available communication means, systems and hardware. Moreover, various components and modules may be substituted with other modules or components that provide similar functions.

It should be appreciated that the device and related components discussed herein may take on all shapes along the entire continual geometric spectrum of manipulation of x, y and z planes to provide and meet the environmental, anatomical, and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, or method steps, even if the other such compounds, material, particles, or method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention itself, together with further objects and attendant advantages, will best be understood by reference to the following detailed description, taken in conjunction with the accompanying drawings.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 1A is a schematic representation of an embodiment including a part of a method of applying a coating to a substrate.

FIG. 1B is a schematic representation of an embodiment including a part of a method of applying the outer layer to the coating layer.

FIG. 1C is a schematic representation of an embodiment including a part of a method of providing a final curing step.

DETAILED DESCRIPTION OF EXEMPLARY EMBODIMENTS

In its broadest aspects, the present invention provides the skilled artisan with the analytical tools and technical know-how sufficient to create a hydrophobic or superhydrophobic coating on a substrate material.

As used herein, a hydrophobic or superhydrophobic surface implies "anti-icing" properties such that, the surface in the presence of liquid water or water vapor, is characterized by the ability to (i) depress the freezing point of water and (ii) delay the onset of freezing of water at a temperature below the freezing point. Additionally, in this specification "water" does not necessarily mean pure water when referencing "hydrophobic properties". Any number or type of impurities or additives may be present in water, as referenced herein.

Figure 10:
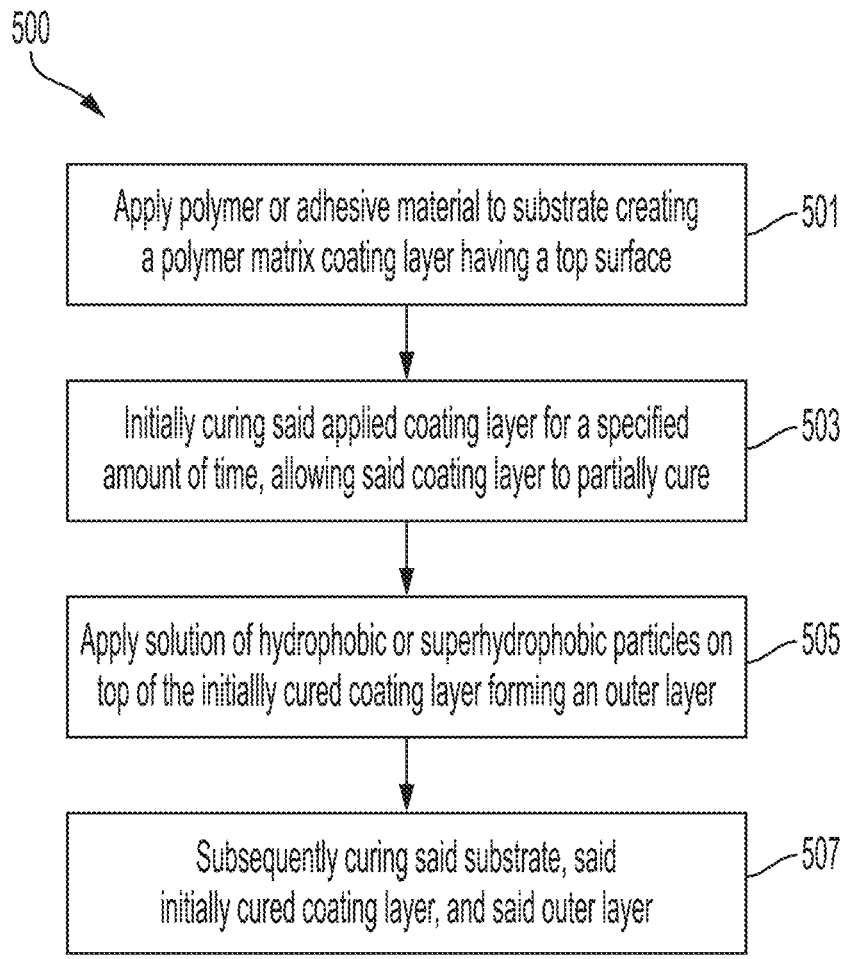
FIG. 10 is a flowchart of an embodiment of the method for creating a microtexture hydrophobic or superhydrophobic coating.

Referring generally to FIG. 10, a flowchart representation of an embodiment of the claimed process 500 can be seen including, for example but not limited thereto, four steps. Step 501 is the initial application of the polymer or adhesive material to the substrate to create a coating layer 15 having a top surface 17. The next step 503 is initially curing the applied coating layer for a specified amount of time, allowing the coating layer to partially cure. Another step 505 includes applying the solution of hydrophobic or superhydrophobic particles on the top surface of the initially cured coating layer, forming an outer layer 19. An additional step 507 is the subsequent curing step, where the substrate, initially cured coating layer, and outer layer are all cured.

Referring generally to FIGS. 1A-1C, in an aspect of an embodiment of the present invention, the process may begin with obtaining a substrate material such as aluminum, or any other material that a polymer or adhesive material can be applied to. The substrate may optionally be placed upon a platform 37. The next step may be applying a polymer or adhesive material to the surface of the substrate. Compounds such as epoxy, resin, foamed acrylic or cyanoacrylate are suitable herein Claim 4, 5. Other resins such as vinyl ester resin and polyester resin can be used. Other adhesive materials can be used. This layer of polymer or adhesive material forms a coating layer which is initially cured before a solution 29, comprising particles and a solvent 28, can be added to in order to form an outer layer. The initial curing 31 can be performed by multiple methods, including, UV curing, plasma curing, thermal curing, ambient air curing, or chemical hardening, or a combination thereof. The curing time for the initial curing can vary depending on the curing method and polymer or adhesive material used.

The initial curing may be various specified durations including but not limited thereto; a range of about 20 minutes to about 25 minutes; a range of about 1 nanosecond to about 1 hour; a range of about 1 hour to about 12 hours; a range of about 1 hour to about 24 hours; or a range of about 1 day to about 5 days. In an embodiment, the duration may be less than or greater than the ranges provided.

In an embodiment, the solution 29 can comprise hydrophobic or superhydrophobic particles 27 of the same or different materials. Particles such as PTFE, polypropylene, polyethylene, polyolefin, polydimethylsiloxane (PDMS), or fluorinated ethylene propylene (FEP) would be suitable for these particles. In an embodiment, other materials may be utilized. Particle sizes may vary but in one embodiment may include a mean diameter of one of the following; a range of about 1 nm to about 25000 nm; a range of about 10 nm to about 15,000 nm; a range of about 100 nm to about 10,000 nm; or about 300 nm. In an embodiment, the mean diameter may be less than or greater than the ranges provided.

In an embodiment, solvents 28 such as acetone, methanol, hexane, or isopropanol would be suitable as the solvent 28 in the solution 29. The solvent and the particles in an embodiment may have a weight fraction of particles to solvent of one of, but not limited to the following: a range of about 0.1% to about 30%; a range of about 1% to about 20%; a range of about 5% to about 10%; a range of about 10% to about 20%; or about 5%. In an embodiment, the weight fraction may be less than or greater than the ranges provided.

In an embodiment, the solution 29 may be applied to the coating layer 15 via an application method 33 such as application with an airbrush or hand application. The application method must have sufficient velocity to partially embed some particles into the coating layer. This required velocity will change depending on the composition of the coating layer 15 and the partial cure length/cure procedure.

One embodiment may include spray pressure for an airbrush including, but not limited to the following: about 10 kPa to about 1.000 kPa; about 100 kPa to about 500 kPa; or about 200 kPa. In an embodiment, the spray pressure may be less than or greater than the ranges provided.

Figure 2A:
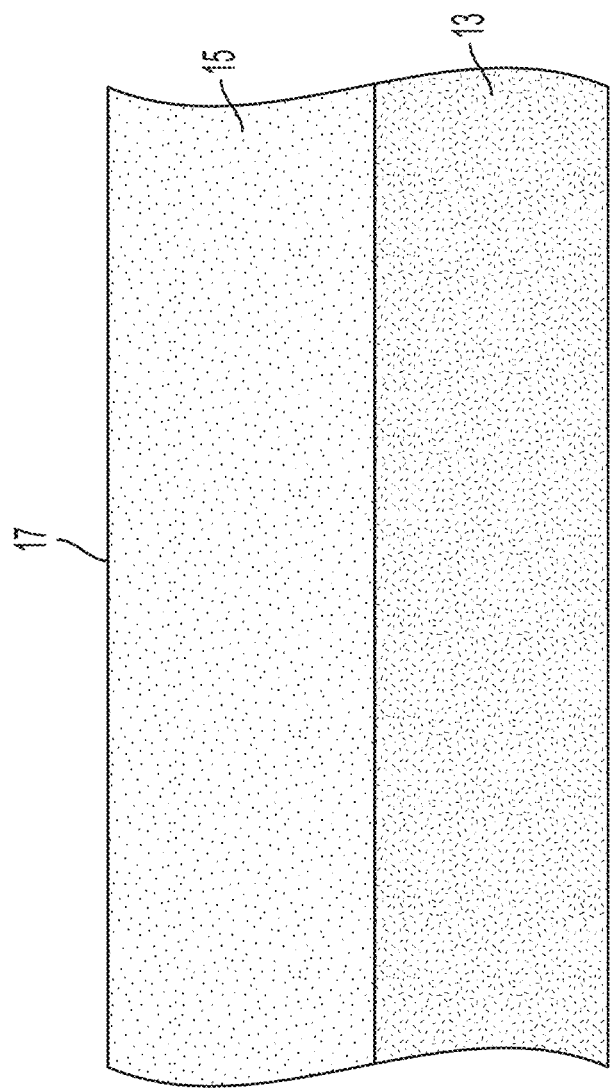
FIG. 2A is a schematic representation of an embodiment whereby the coating layer has been applied to the substrate.
Figure 2B:
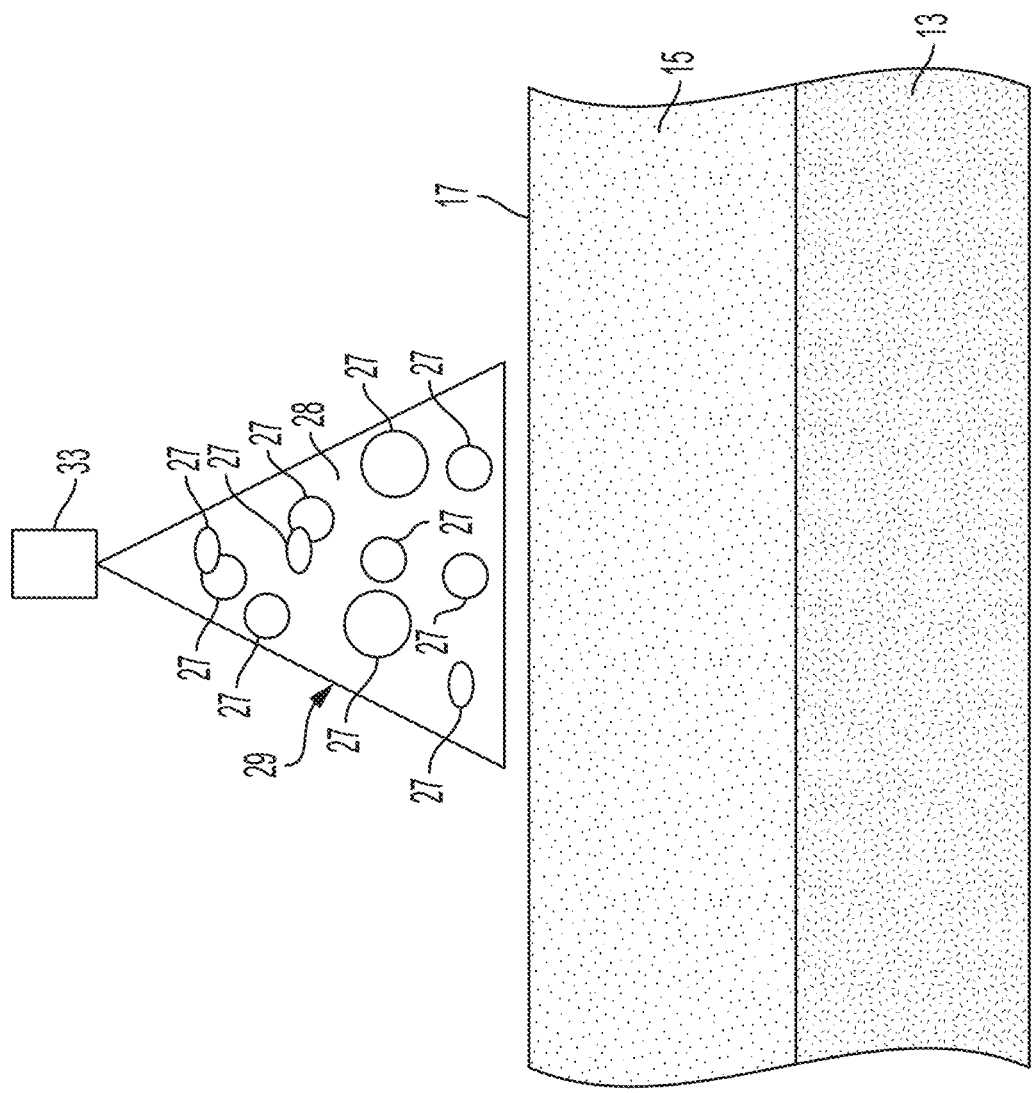
FIG. 2B is a schematic representation of an embodiment of the solution being applied to the coating layer.
Figure 2C:
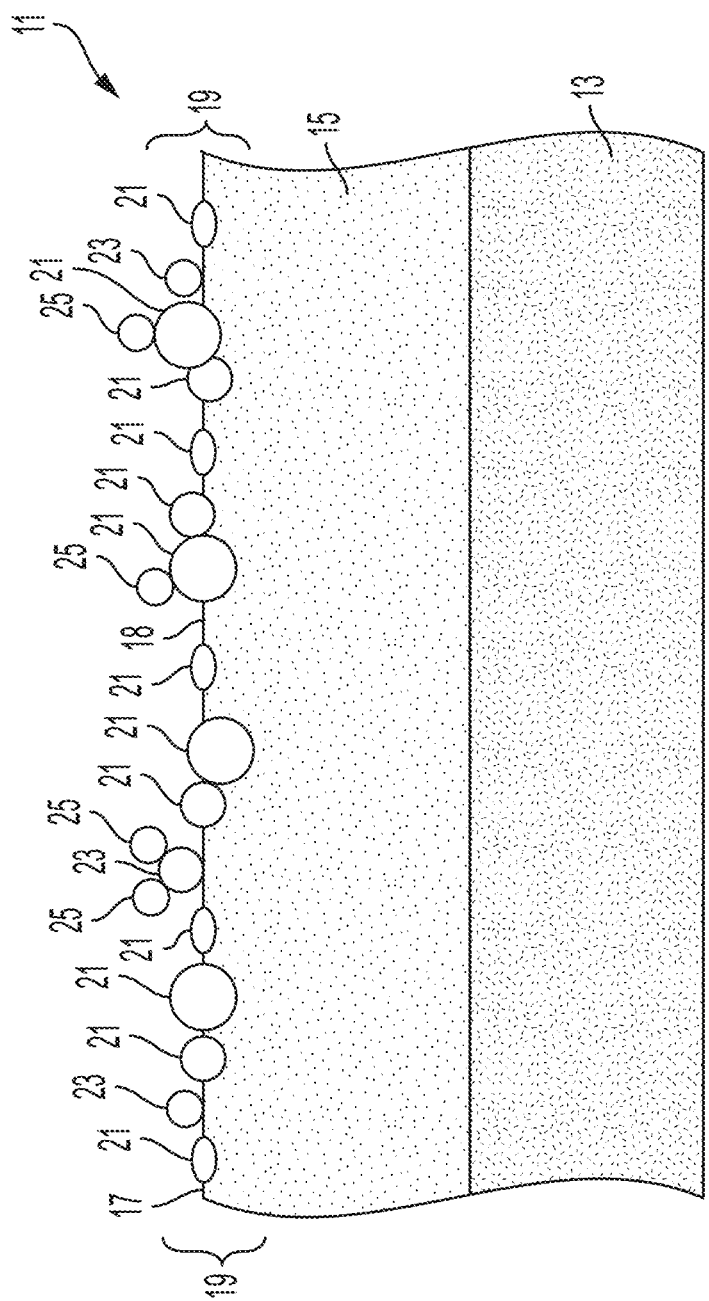
FIG. 2C is a schematic representation of an embodiment of the outer layer being formed including possible arrangements of the hydrophobic and superhydrophobic particles partially embedded in the top surface, touching the top surface and not touching the top surface so as to form the outer layer.

In an embodiment, referring to FIG. 2C, the solution 29 (shown in FIG. 2B) containing the particles (denoted as 21) will partially embed themselves into the coating layer 15 and accumulate on top surface 17 of the coating layer 15. Some of the particles (denoted as 23) may accumulate in contact with the top surface 17 of the coating layer 15, without being embedded in the coating layer 15. Some of the particles may clump into groups resulting in some particles (denoted as 25) only touching other particles (denoted as 21 or 23), without touching the coating layer 15. The particles (denoted as 21, 23, and 25) constitute the outer layer 19. It is possible that gaps 18 may be present on the top surface 17 between some of the particles. In an alternative embodiment, referring to FIG. 2D, the particles 26 may be entirely embedded in the coating layer 15, without being in contact with the outer layer 19 or without any exposure outside the coating layer 15.

Figure 2D:
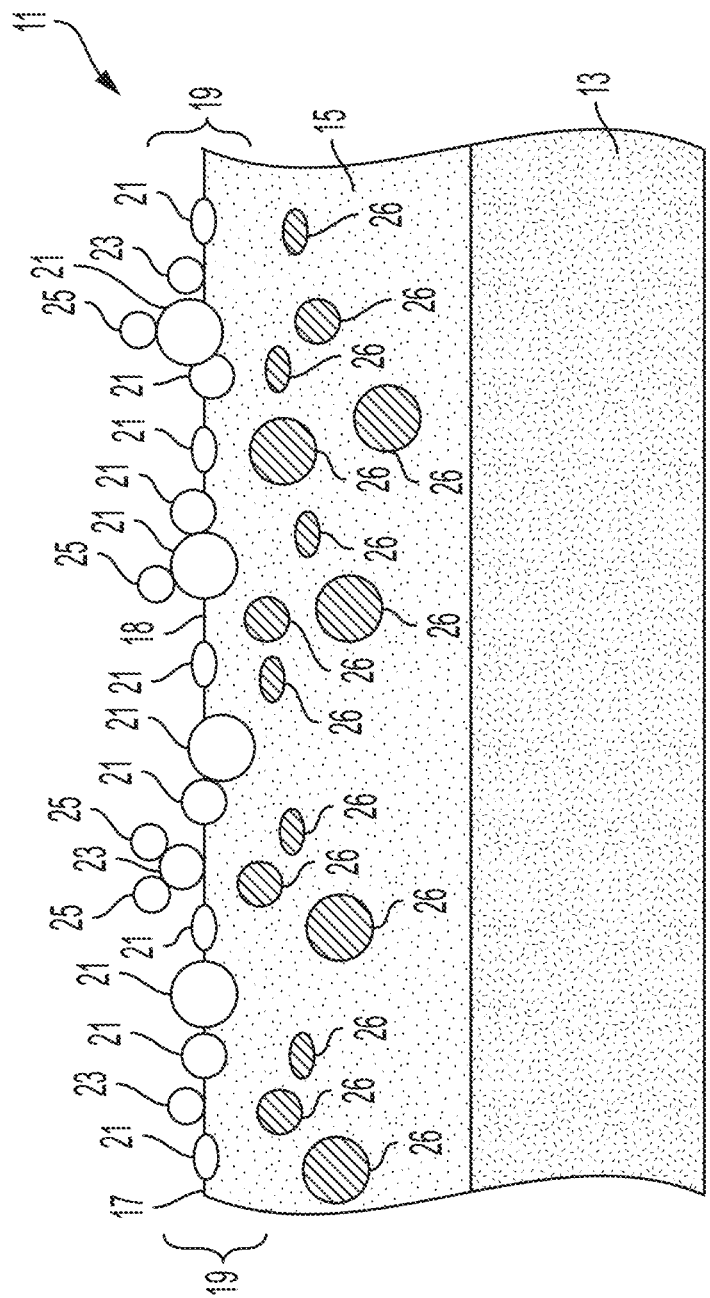
FIG. 2D is a schematic representation of an embodiment of the outer layer being formed including possible arrangements of the hydrophobic and superhydrophobic particles partially embedded in the top surface, touching the top surface and not touching the top surface so as to form the outer layer; and whereby the other particles are entirely embedded into the coating layer.
Figure 2E:
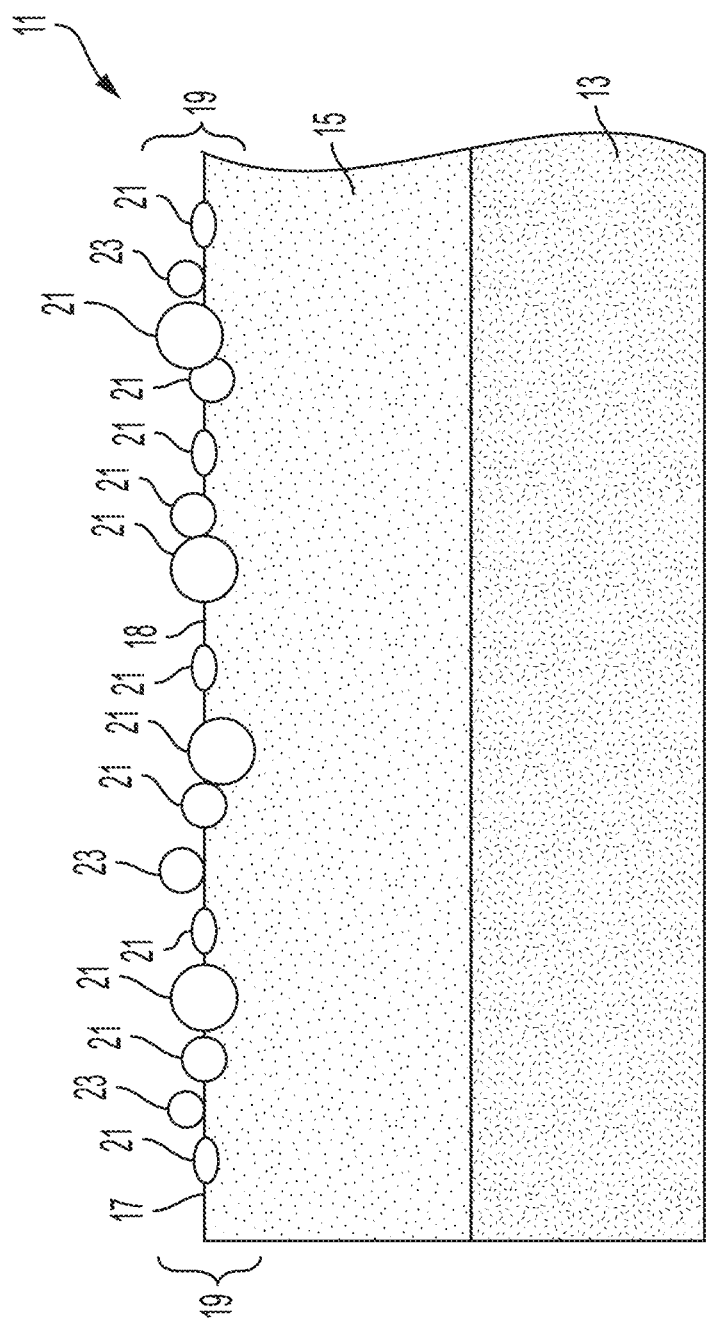
FIG. 2E is a schematic representation of an embodiment of the outer layer being formed including possible arrangements of the hydrophobic and superhydrophobic particles partially embedded in the top surface and touching the top surface as so as to form the outer layer.

Referring to FIG. 2E, the solution 29 (shown in FIG. 2B) containing the particles (denoted as 21) will partially embed themselves into the coating layer 15 and accumulate on top surface 17 of the coating layer 15. The particles (denoted as 23) may accumulate in contact with the top surface 17 of the coating layer 15, without being embedded in the coating layer 15.

Still referring generally to FIGS. 2C and 2E, the substrate, the coating layer, and the outer layer are then subsequently cured for a specified amount of time. This curing can be done via multiple methods, including furnace curing, UV curing, plasma curing, ambient air curing, or chemical hardening, or a combination thereof Claim 15. This curing can also range in time and temperature depending on the curing method.

In an embodiment, the subsequent curing may include temperatures including, but not limited to: a range of about 10° C. to about 45° C.; a range of about 10° C. to about 400° C.; a range of about 400° C. to about 750° C.; a range of about 10° C. to about 750° C.; a range of about −200° C. to about 400° C. a range of about 100° C. to about 750° C.; a range of about 200° C. to about 500° C.; a range of about 300° C. to about 400° C.; or about 315° C. For example, liquid nitrogen could be at −200° C. In an embodiment, the temperature may be less than or greater than the ranges provided.

In an embodiment, the subsequent curing may include a time length including, but not limited to: a range of about 1 month to about six months; a range of about 4 hours to about 3 days; a range of about 1 nanosecond to about 1 hour; a range of about 1 minute to about 1 day; about 12 hours; about 24 hours; or about 2 days; about a month; about a year. In an embodiment, the duration may be less than or greater than the ranges provided.

Structure Description

In its broadest aspects, an aspect of an embodiment of the present invention is a composition configured to be disposed on a substrate 13. In an embodiment, the composition may comprise a coating layer 15 disposed on the substrate wherein the composition includes a top surface 17 of the coating layer 15 and an outer layer 19 disposed on the coating layer 15. The coating layer 15 can comprise a polymer or adhesive material including one or more of the following: resin, epoxy, foamed acrylic or cyanoacrylate. The outer layer 19 may comprise substantially uniform distributed hydrophobic particles or superhydrophobic particles 27. The hydrophobic or superhydrophobic particles can be either of the same material or of different materials. The particle materials may include PTFE, polypropylene, polyethylene, polyolefin, polydimethylsiloxane (PDMS), or fluorinated ethylene polypropylene (FEP), or any combination thereof. An embodiment may include, but is not limited to, the particles with a mean diameter of: a range of about 1 nm to about 25,000 nm; a range of about 10 nm to about 15,000 nm; a range of about 100 nm to about 10,000 nm; or about 300 nm. In an embodiment, the mean diameter may be less than or greater than the ranges provided.

Referring generally to FIG. 2A-2B, in an embodiment the composition begins with a substrate 13, coating layer 15, and top surface of the coating layer 17. A solution 29 comprising hydrophobic particles or superhydrophobic particles 27 and a solvent 28 is then applied to the coating layer via an applicator 33.

Referring generally to FIG. 2C-2E, in an embodiment the composition is disposed on the substrate 13 that may comprise:
a) individual hydrophobic particles or superhydrophobic particles 21 that are partially embedded into the partially cured coating layer 15 while also being partially exposed above the top surface 17 of the partially cured coating layer 15 to form the outer layer 19,
b) individual hydrophobic particles or superhydrophobic particles 23 that are fixedly disposed in contact with the top surface 17 of the partially cured coating layer 15 without being embedded within the partially cured coating layer to form the outer layer 19,
c) individual hydrophobic particles or superhydrophobic particles 25 that are optionally, fixedly disposed in contact with the outer layers of 'a' (depicted as 21) and/or 'b' (depicted as 23) without being in contact with the partially cured coating layer 15 to form the outer layer 19, and
d) individual hydrophobic particles or superhydrophobic particles 26 that are optionally, entirely embedded in the partially cured coating layer 15 apart from the outer layer 19.

Still referring generally to FIG. 2C-2E, the outer layer 19 exhibits hydrophobic properties or superhydrophobic properties after the substrate 13, partially cured coating layer 15, and outer layer 19, are subsequently cured at a specified temperature for a specified period of time.

In an embodiment, the outer layer 19 may exhibit a peak-valley difference of, but is not limited to: a range of about 1 nm to about 300,000 nm, a range of about 1,000 nm to about 300,000 nm, a range of about 1 nm to about 50,000 nm, a range of about 1,000 nm to about 300,000 nm, a range of about 10,000 nm to about 200,000 nm, a range of about 50,000 nm to about 100,000 nm, or about 39,000 nm. In an embodiment, the peak-valley difference may be less than or greater than the ranges provided. For example, the peak-valley difference is based on the particles used in the creation of the outer layer. As such, the peak-valley difference must at least cover the sizes of the various particles. Peak-valley ranges will be entirely dependent on particle diameter and is irrespective of material. Therefore, peak-valley difference will be the same for hydrophobic and superhydrophobic, if the particles are the same diameter.

In an embodiment, the outer layer 19 may be used commercially as one of the following: an outer surface of an aircraft wing wherein the substrate is an aircraft wing component, an outer surface of a turbine blade wherein the substrate is a turbine blade component, an outer surface of a cooling or heating system blade wherein the substrate is a cooling or heating system blade component, an outer surface of a cooling or heating system coil wherein the substrate is a cooling or heating system coil component, an outer surface of a wind turbine wherein the substrate is a wind turbine component, an outer surface of a solar panel wherein the substrate is a solar panel component, an outer surface of a window wherein the substrate is a window component. Other equivalent uses are well within the skill of the ordinary practitioner and would require no more than routine experimentation. Available methods for the fabrication of various substrates and structures are also considered part of the present invention. Other substrates and structures may, of course, be employed within the context of the invention.

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Results Set No. 1

Preparation of PTFE Teflon Particle Coatings

The PTFE nanoparticles were selected as the microtexture material because of PTFEs low surface energy and natively hydrophobic properties. The PTFE powder used in the present study was Fluo X-1406, obtained from Micro Powders Inc. The Fluo X-1406 is a pure PTFE powder with an average particle size around 300 nm. In the experimental processes, the Fluo X-1406 particles were dispersed in acetone to achieve 5% weight fraction suspension for spray coating.

Fabrication of the Spray-Coated Surfaces

To fabricate the anti-icing surface with the spray coating concept, for example, there were three major steps, shown schematically in FIG. 1. FIG. 1A is a schematic depiction of the substrate 13 with the coating layer 15 disposed on it, while optionally resting upon a hotplate 35 to facilitate even distribution of the coating layer. The coating layer is initially cured by an initial curing source 31. FIG. 1B is a schematic depiction of an application method of the outer layer 19. The solution 29 of particles can be applied via an application method such as using an applicator 33 or other type of a spray device. FIG. 1C is a schematic depiction of the subsequent curing step where the structure 11 is cured by a subsequent curing source 39, wherein the curing step may be accomplished by a furnace, or in an embodiment may be accomplished in an ambient environment. Optionally, the structure 11 may be set on a platform 37 or the like.

In an embodiment, a first step, for example, was to prepare the epoxy resin layer and to partially cure it. A hotplate was employed with a surface temperature set to 90° C. The aluminum substrate was placed on the hotplate. Due to the temperature gradient in the aluminum and the heat transfer with the surrounding air, the actual temperature on the top of aluminum in this configuration was about 40-50° C. The elevated aluminum substrate temperature decreased the viscosity of the epoxy resin. This, in turn, caused the epoxy resin which was poured onto the aluminum to more easily spread and achieve complete and uniform surface coverage. After about 5 to 10 minutes, the epoxy resin became sticky, and polymer chains of the epoxy resin could be pulled from the bulk on the substrate. After about 20 to 25 minutes, the epoxy resin remained sticky, but the polymer chains could no longer be pulled from the bulk. At this point in the curing process of the epoxy, the spray coating of PTFE particles was applied while the sample was still on the hot plate. After about 35 minutes, the epoxy resin was fully cured and became hard. The reason for using partially cured epoxy resin rather than fully-cured was because these PTFE particles partially embedded into the half-cured epoxy resin. In a second step, for example, the PTFE particles were dispersed in acetone and the 5% weight fraction suspension was poured in the cup of the airbrush. The airbrush used in the experiments was a Badger Model R2S, and the spray coating air pressure was set at 200 kPa. The distance between the airbrush nozzle and the coating surface was around 200 mm. Multiple coating layers were applied, until the epoxy resin surface became opaque because the PTFE particles are white in color. In a third step, for example, the coated sample was placed in a furnace. The furnace temperature was set at 315° C. The thermal gravimetric analysis (TGA) showed that the temperature of epoxy resin degradation is greater than 300° C., and it can be improved by being filled with micro- or nano-particles. Furthermore, the temperature of the epoxy resin cannot reach the furnace temperature because of the temperature gradience, ensuring that the epoxy resins cannot be decomposed. The plain epoxy resin samples have been set in the same furnace conditions, and no decomposition was investigated. There are various objectives and purposes of this furnace operation. For example, a first purpose was to vaporize the acetone left on the sample. A second purpose and one of the essential components of the procedure were to soften and partially melt the particles in order to strengthen the bonding between PTFE particles, as well as the bonding between PTFE particle clusters and PTFE particles that are partially embedded epoxy resin due to spray injection. For example, a third purpose was to fully cure the epoxy resin. When these steps were done, the sample was moved out into room temperature and allowed to sit for 24 hours. As a result, the mechanical bonding between the PTFE particles and the epoxy resin is enhanced after the processing.

Example and Experimental Results Set No. 2

Procedure for Determining Structure Characteristics

The 3-D surface feature topology and measurements were carried out by a white light interferometer (NewView 7300, Zygo) by the present inventor. Scanning electron microscope (SEM) imaging of the surface was conducted using a Quanta 650 (FEI) microscope under low vacuum conditions. Low vacuum conditions allowed for the non-destructive imaging of the samples and without a conductive coating.

The wetting properties of the spray-coated surface were determined by the measurements of contact angle (CA) and roll-off angle (ROA). The anti-icing property evaluation was done by the ice adhesion strength measurements. During the CA measurements, 10 µL drops of deionized water were placed on the spray-coated surface, which was mounted on the platform of a custom-built goniometer. The profile image of the drop and the surface was captured by a camera. Then the pictures were post-processed and analyzed using ImageJ with the DropSnake plugin to get the CA values. During the ROA measurements, 20 µL drops were used instead of 10 µL, and the platform of the goniometer was tilted until the drop started to roll off. This tilt angle was recorded as the ROA. The wetting characterization procedure is common to this type of study, and was the same as the experimental methods previously done by the UVa research group. [See Mulroney, A. T., Kessler, E. D., Combs, S. and Gupta, M. C., 2018. Low ice adhesion surfaces using microtextured hydrophobic tapes and their applications in refrigeration systems, *Surface and Coatings Technology*, 351, pp. 108-114, of which is hereby incorporated by reference herein in its entirety; and See Caffrey, P. O. and Gupta, M. C., 2014, Electrically conducting superhydrophobic microtextured carbon nanotube nanocomposite, *Applied Surface Science*, 314, pp. 40-45, of which is hereby incorporated by reference herein in its entirety.] Per each sample, five individual CA and ROA measurements were made, and the reported value was the average of the measurements.

The formation of ice on the sample surface occurred under the temperature of −10° C. and the relative humidity (RH) of 16% within a commercial freezer. In order to control the contact area, a 7.4 mm plastic tube was placed on the surface and then it was filled with deionized water, shown in FIG. 2. Pure deionized water was used, and the period of ice formation before measuring ice adhesion strength was 30 minutes. To test the durability of icing detachment, the measurements were also repeated on the same location of the same sample. Since the diameter of the ice cylinder was found to be 7.4 mm, this value was used to calculate a contact area of 42.55 mm$^2$ and therefore served as the area used to calculate the ice detachment pressure.

Figure 3:
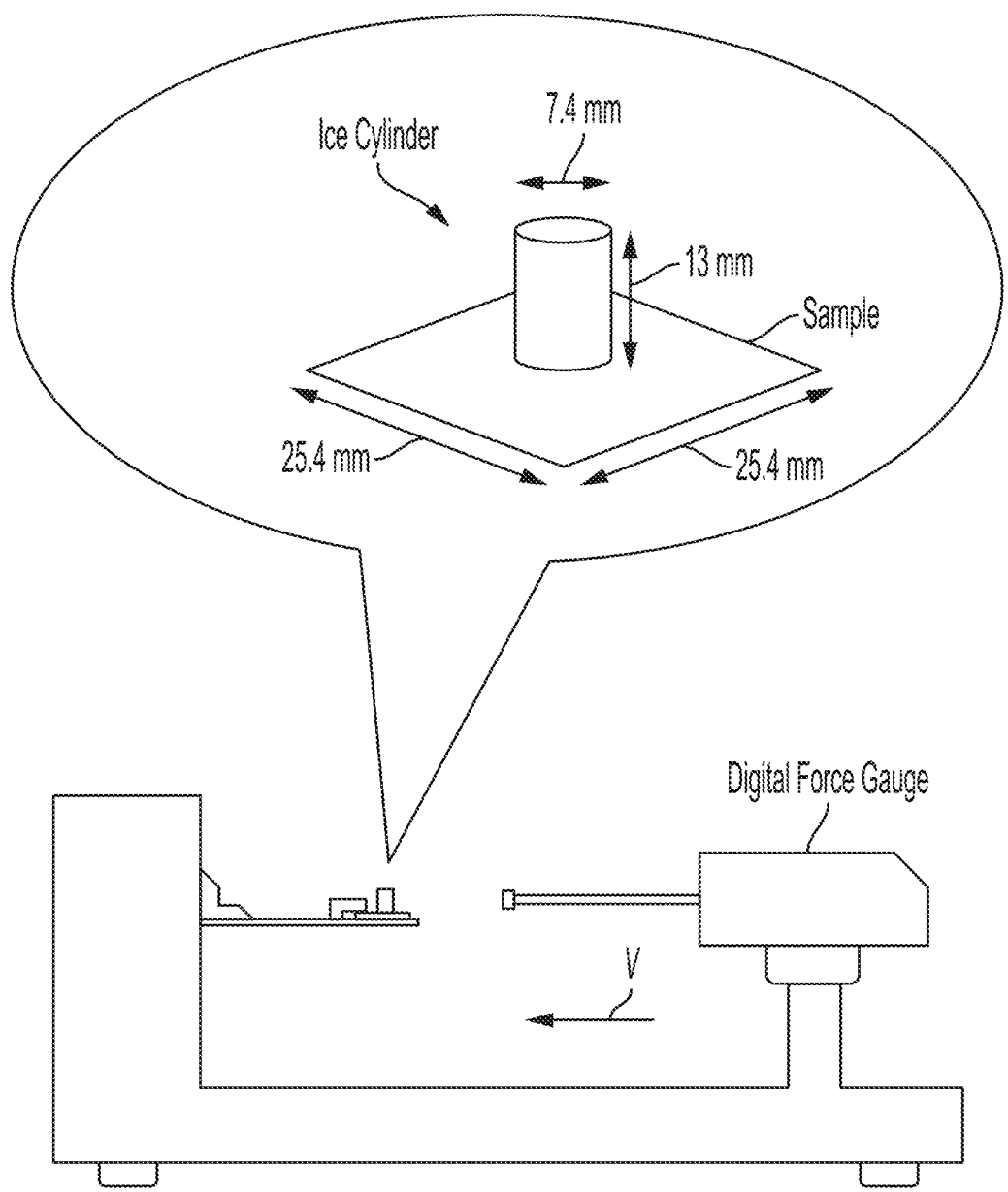
FIG. 3 is a schematic of an experimental apparatus to determine the ice detachment pressure of a surface denoted as sample.

As our research group demonstrated previously [See Mulroney, A. T., Kessler, E. D., Combs, S. and Gupta, M. C., 2018. Low ice adhesion surfaces using microtextured hydrophobic tapes and their applications in refrigeration systems, *Surface and Coatings Technology*, 351, pp. 108-114, of which is hereby incorporated by reference herein in its entirety.], a Shimpo Digital Force Gauge (FG 7002) mounted on a Shimpo hand wheel operated test stand (FGS 250W) was employed to obtain the ice detachment pressure. The sketch of the test system is shown in FIG. 3. During the measurements, the surface (labeled as "sample") with ice in a cylinder of known diameter was carefully mounted on the platform immediately after moving from the freezer. The force gauge probe was moved on a horizontal axis towards to the ice cylinder at a constant speed. When the probe touched the side of the ice cylinder, the force gauge recorded the force until the ice detachment occurred. The peak value of the force was considered for the detachment pressure calculation. The reported results were based on the averaged values of 5 repeated experiments (See FIGS. 7 and 8).

Figure 4:
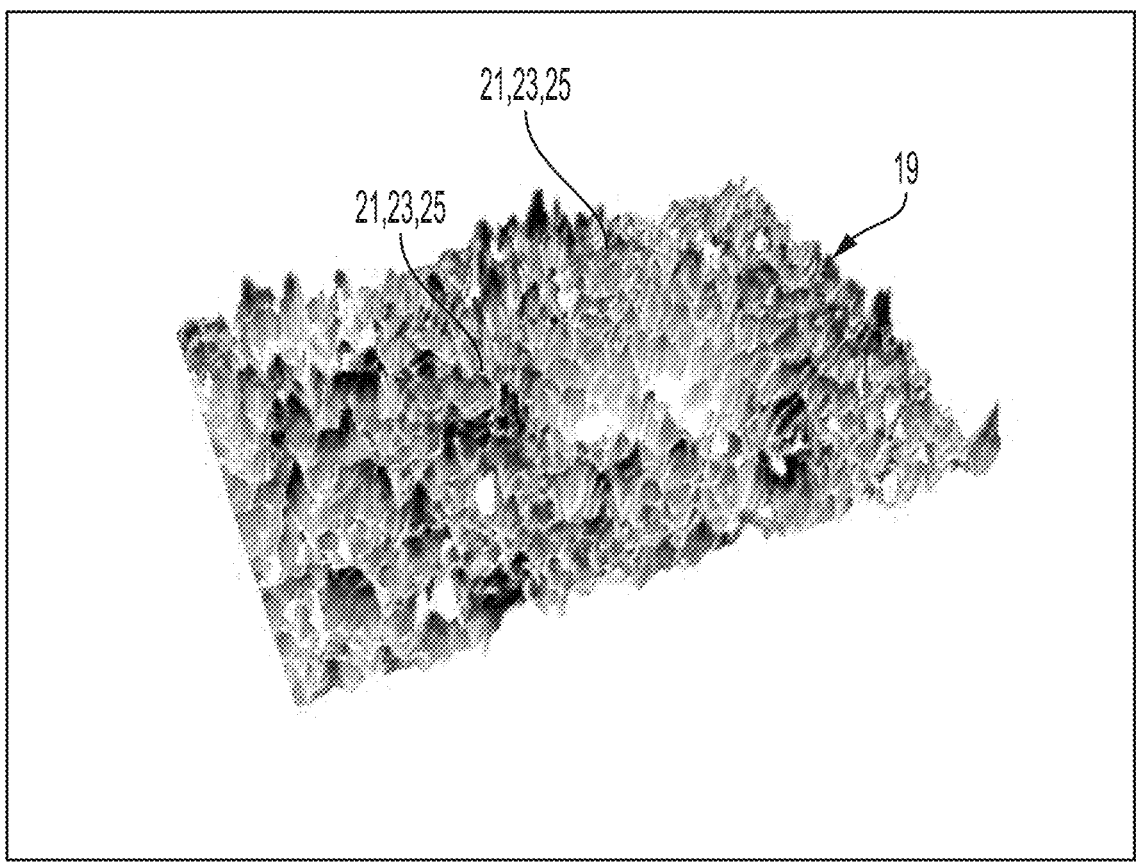
FIG. 4 is a depiction of a white-light profilometer scan showing an embodiment of the outer layer having a roughness with a peak (black color) which is positive 19.8 μm while the valley (white color) is negative 19.2 μm.

Structure of Spray Coated Surface:

FIG. 4 shows the results of the white light interferometry characterization, used to obtain root-mean-square roughness of the coated surface. FIG. 4 depicts the outer layer 19 with particles (denoted as 21) partially embedded in the coating layer, particles (denoted as 23) fixed in contact on top surface 17 of the coating layer 15, but not embedded in the coating layer 15, and particles (denoted as 25) in contact with other particles (denoted as 21 and 23) but not in contact with the coating layer 25. In an embodiment, the scan area is 570 µm by 400 µm, and the peak-valley difference is 39.0 µm. It can be seen from this figure that the developed method of spray coating PTFE particles generated a microtextured surface. The root-mean-square roughness and the arithmetical mean deviation is 4.37 µm and 3.39 µm respectively.

Figure 5A:
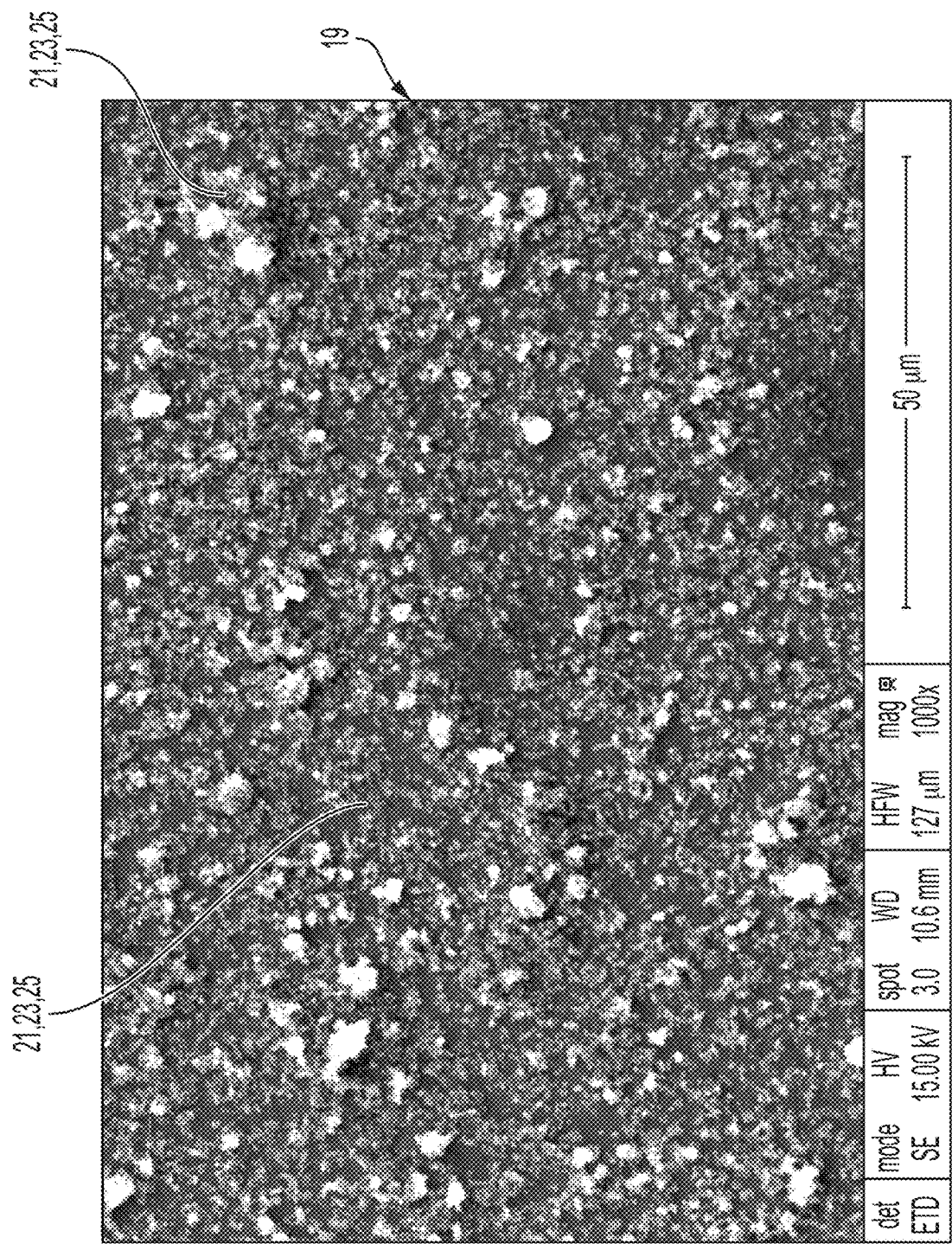
FIG. 5A is a depiction of a scanning electron microscope (SEM) image of outer layer of an embodiment at 1,000 times magnification.
Figure 5B:
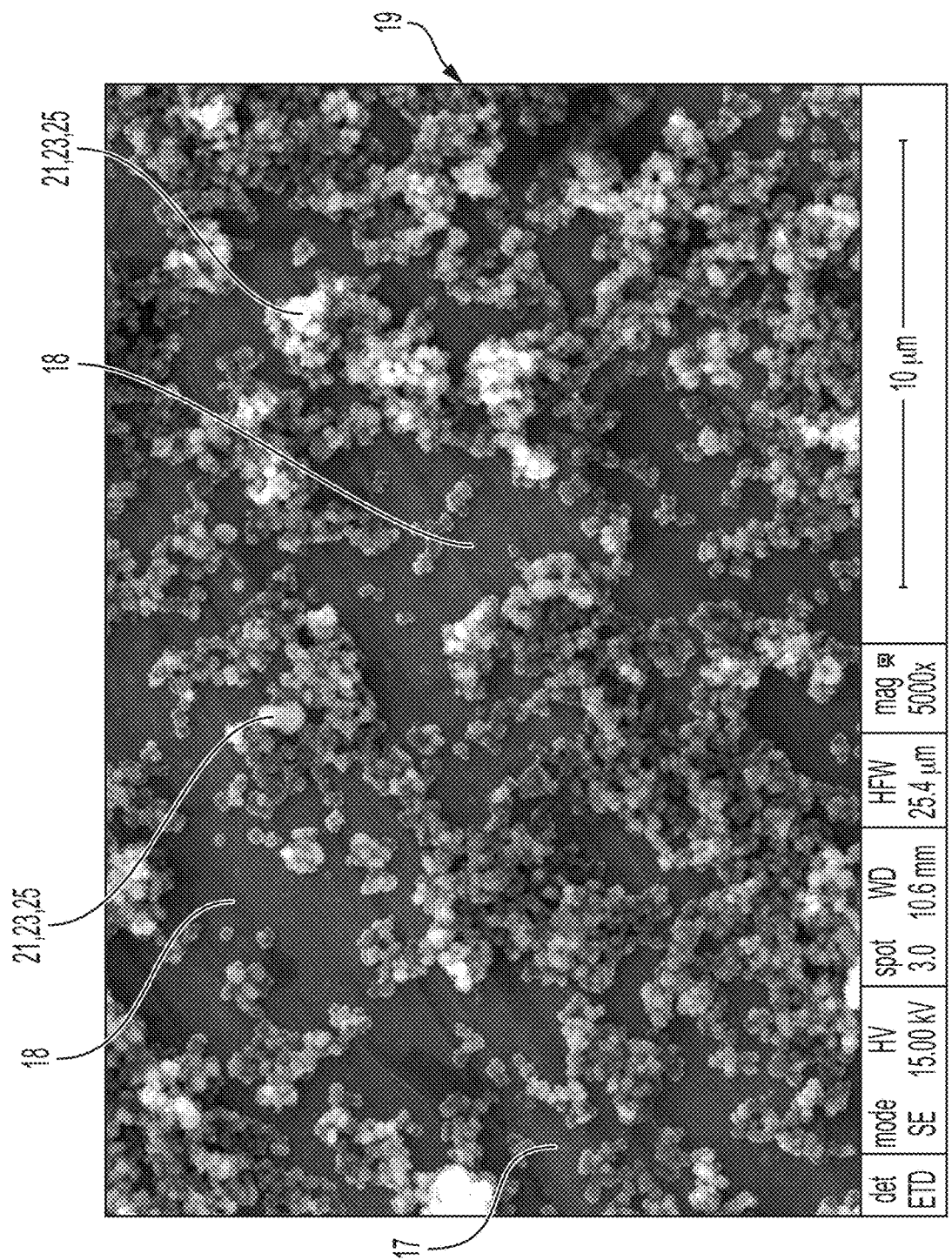
FIG. 5B is a depiction of an SEM image of outer layer of an embodiment at 5,000 times magnification.
Figure 5C:
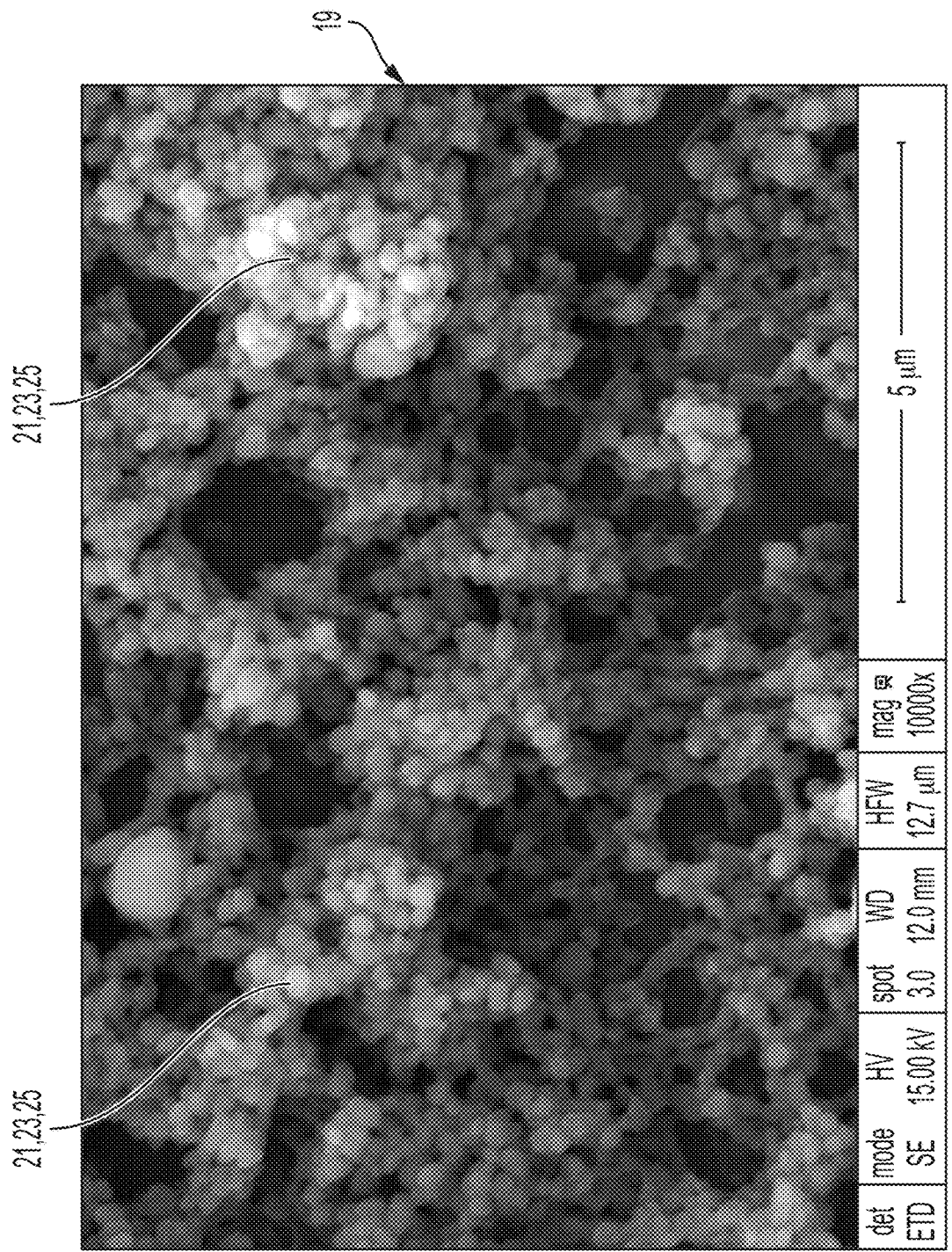
FIG. 5C is a depiction of an SEM image of the outer layer of an embodiment at 10,000 times magnification.

SEM images of the outer layer 19 at different magnifications are shown in FIG. 5. FIG. 5 depicts the outer layer 19 with particles (denoted as 21) partially embedded in the coating layer 15, particles (denoted as 23) fixed in contact on the top surface 17 of the coating layer 15, but not embedded in the coating layer, and particles (denoted as 25) in contact with other particles (denoted as 21 and 23) but not in contact with the coating layer 25. In an embodiment, the surface roughness of microns in size could be observed on the surface for images acquired at 1,000 times and 5,000 times (FIGS. 5A and 5B). FIG. 5C is a higher magnification, compared to FIGS. 5A and 5B, at 10,000 times, which also revealed the existence of micron-scale clusters and 300-nm sized particles embedded within the clusters. FIG. 5B additionally depicts gaps 18 of the top surface 17 of the outer layer 19 between clusters of particles (denoted as 21, 23 and 25).

It should be appreciated that FIGS. 4-5 have a plurality of particles (denoted as 21, 23, and 25) and should not be limited by the amount called out in the drawing.

Figure 6:
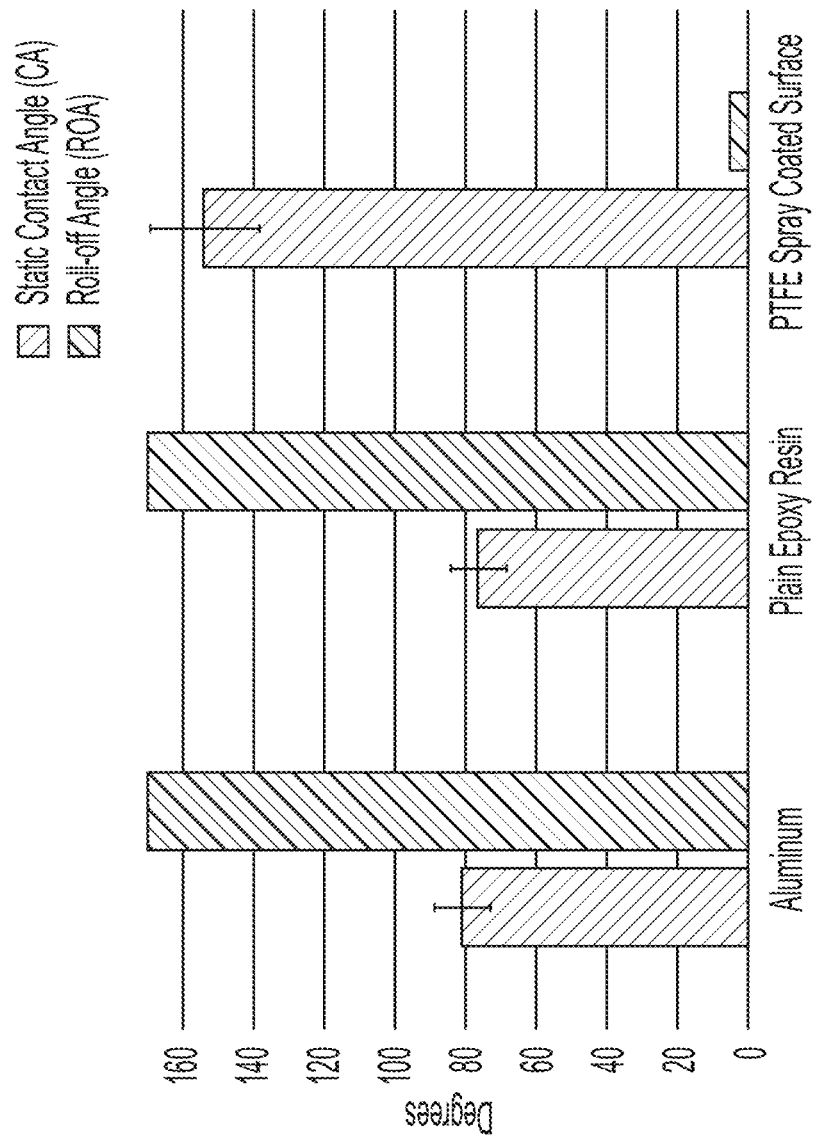
FIG. 6 is a graphical representation of an experimental comparison of the contact angle (CA) and the roll off angle (ROA) of aluminum, of plain epoxy resin, and of a PTFE spray coated surface that which represents the outer layer of an embodiment.

FIG. 6 is a graphical representation of an experimental comparison of the contact angle (CA) and the roll off angle (ROA) of aluminum, of plain epoxy resin, and of a PTFE spray coated surface that which represents the outer layer 19 (not shown) of an embodiment. As seen in FIG. 6, the spray coated surface was significantly more hydrophobic when compared to aluminum and plain epoxy resin surfaces. The PTFE spray coated surface demonstrated a CA of 154.4°. This CA was much higher than that for both polished aluminum at 81°, smooth epoxy resin at 76°, and 115° for smooth PTFE. [See Mulroney, A. T., Kessler, E. D., Combs, S. and Gupta, M. C., 2018. Low ice adhesion surfaces using microtextured hydrophobic tapes and their applications in refrigeration systems, *Surface and Coatings Technology*, 351, pp. 108-114, of which is hereby incorporated by reference herein in its entirety.] The ROA of the spray coated surface was 2°, being so low that water drops rolled off immediately when placed on the surface. To compare, water drops were pinned on both the aluminum and epoxy resin surfaces; while for smooth PTFE, the ROA is 23.3°. [See Mulroney, A. T., Kessler, E. D., Combs, S. and Gupta, M. C., 2018. Low ice adhesion surfaces using microtextured hydrophobic tapes and their applications in refrigeration systems, *Surface and Coatings Technology*, 351, pp. 108-114, of which is hereby incorporated by reference herein in its entirety.] This demonstrated that spray coating of PTFE particles can introduce the surface microtexture to achieve superhydrophobicity. Considering the low ROA of the powder-coated surface specifically, the droplet mobility of the low surface energy PTFE is integral. As investigated, the low surface energy property of PTFE was used to produce a surface with high droplet mobility and therefore a surface with a much lower ROA.

Figure 7:
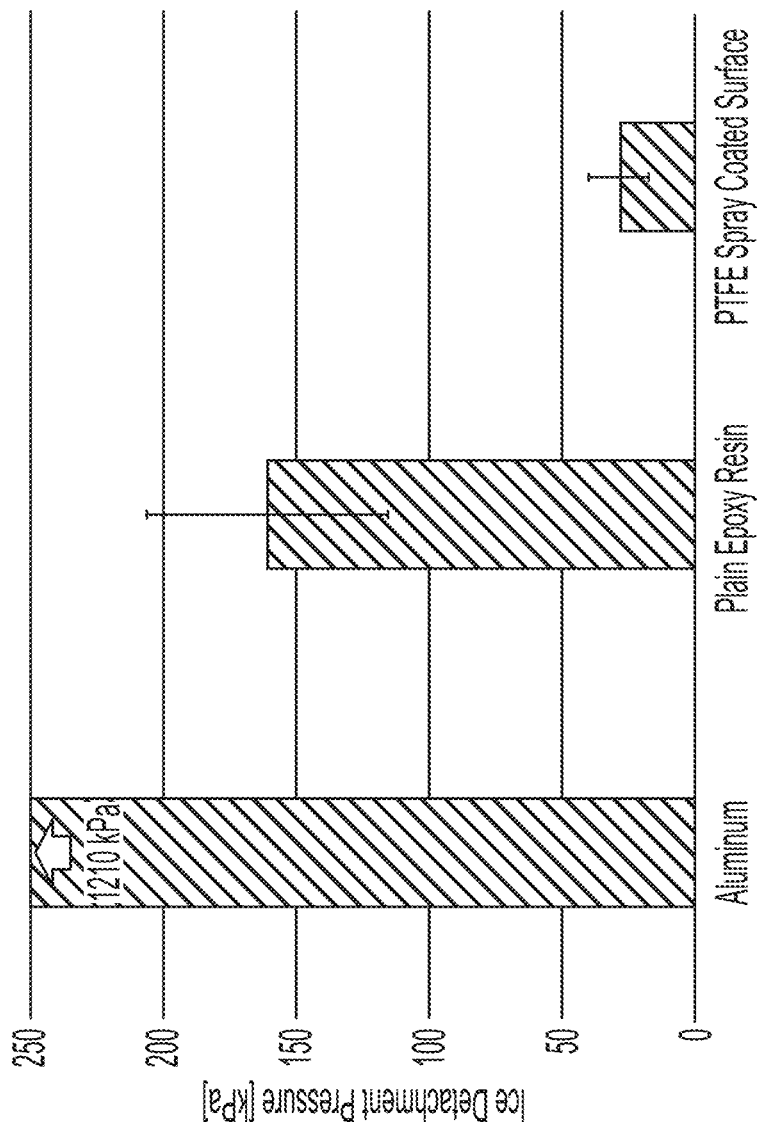
FIG. 7 is a graphical representation of an experimental comparison of ice detachment pressure of aluminum, of plain epoxy resin, and of a PTFE spray coated surface that which represents the outer layer of an embodiment.

FIG. 7 is a graphical representation of an experimental comparison of ice detachment pressure of aluminum, of plain epoxy resin, and of a PTFE spray coated surface that represents the outer layer 19 of an embodiment. Ice detachment pressure for an ice cylinder frozen to the surface with a forming mold of known diameter for each surface is summarized in FIG. 7. The PTFE spray coated surface demonstrated an average detachment pressure of 28 kPa, while the plain epoxy resin demonstrated an average detachment pressure at 161 kPa. We previously measured the ice detachment pressure for smooth PTFE at 137 kPa. [See Mulroney, A. T., Kessler, E. D., Combs, S. and Gupta, M. C., 2018. Low ice adhesion surfaces using microtextured hydrophobic tapes and their applications in refrigeration systems, *Surface and Coatings Technology*, 351, pp. 108-114, of which is hereby incorporated by reference herein in its entirety.] The detachment pressure for the polished aluminum could not be directly measured as it was above the range (10 N in forces, 232.5 kPa in pressure) for the digital force gauge. The aluminum ice adhesion strength value of 1210 kPa was based on the previous measurements by Yang et al. [See Yang, S., Xia, Q., Zhu, L., Xue, J., Wang, Q. and Chen, Q. M., 2011, Research on the icephobic properties of fluoropolymer-based materials, *Applied Surface Science*, 257(11), pp. 4956-4962, of which is hereby incorporated by reference herein in its entirety.] The ice adhesion experiments on the spray-coated surface revealed that its ice detachment strength was very low: about 2.5% of the ice detachment strength of an aluminum substrate, 12.5% of the ice detachment strength of a pure epoxy resin surface, 20.5% of the ice detachment strength of a smooth non-textured PTFE Teflon sheet, and among the lowest superhydrophobic ice adhesion strength reported in literature.

Figure 8:
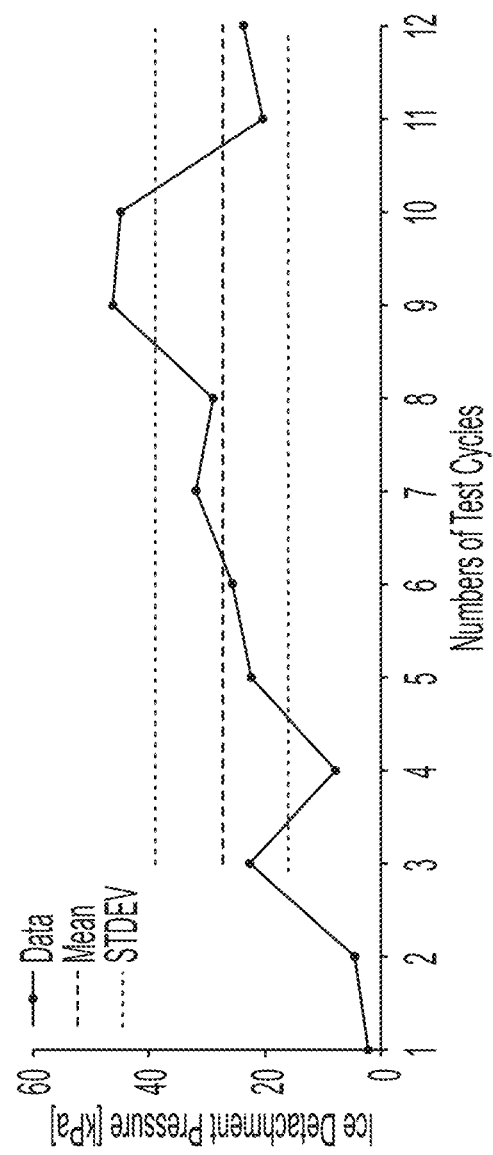
FIG. 8 is a graphical representation of successive test cycles of ice detachment pressures of the outer layer of an embodiment.

FIG. 8 is a graphical representation of successive test cycles of ice detachment pressures of the outer layer 19 of an embodiment. To demonstrate the durability of the PTFE spray coating, the ice adhesion and detachment tests were then repeated on the same area of the same sample for more than 10 times. The interval between two tests varied from 30 minutes to 12 hours. In FIG. 8, the ice detachment pressures are shown in a time series. The first two data points were neglected for the mean and standard deviation calculations. It could be observed that within 10 cycles, the ice detachment pressures were maintained in a region that has a mean value of 27.5 kPa and a deviation value of 11.4 kPa. The surface has been investigated through the optical microscope, and it is confirmed that there was no damage to the coating. Thus, it shows that this fabricated surface has the capability to keep its function during repeated ice adhesions and detachments.

Figure 9A:
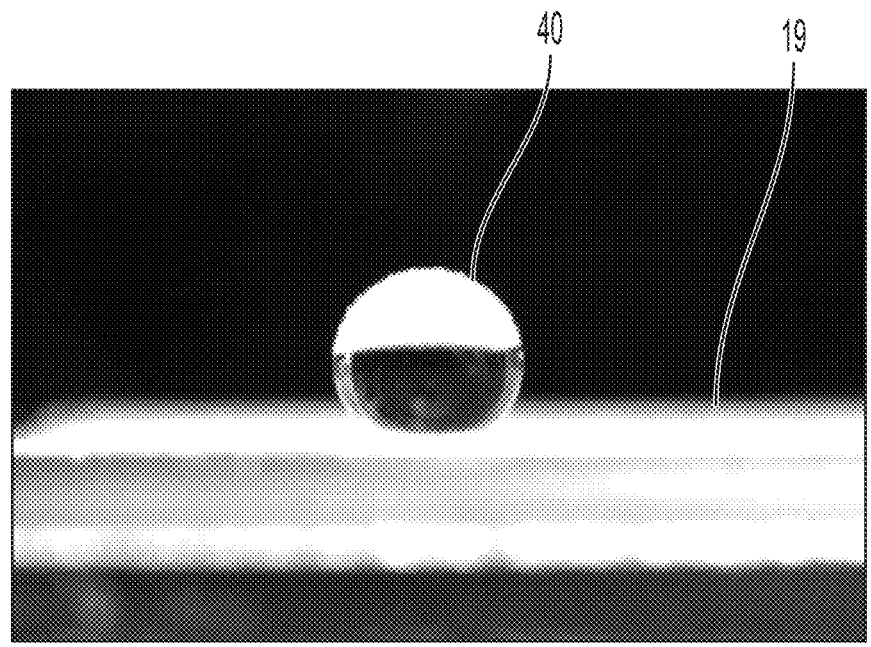
FIG. 9A is photographic depiction of a water droplet on a 25.4 mm by 25.4 mm dimension outer layer of an embodiment.
Figure 9B:
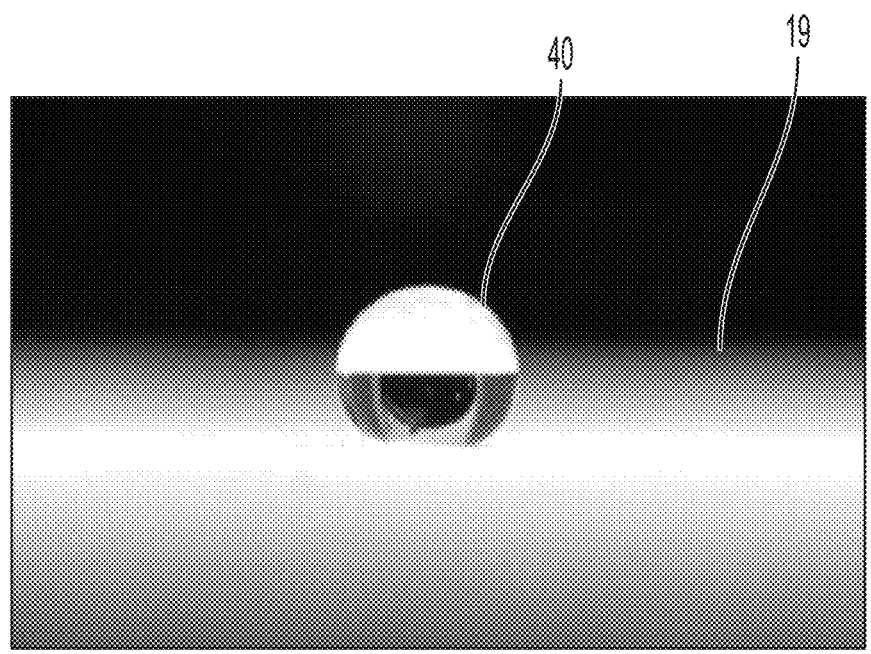
FIG. 9B is photographic depiction of a water droplet on a 101.6 mm by 101.6 mm dimension outer layer of an embodiment.

FIG. 9A is photographic depiction of a water droplet 40 on a 25.4 mm by 25.4 mm dimension outer layer 19 of an embodiment. FIG. 9B is photographic depiction of a water droplet 40 on a 101.6 mm by 101.6 mm dimension outer layer 19 of an embodiment. In addition, it is worth noting that this spray coating method can be used for a large area. To demonstrate this scalability of the coating method, a 101.6 mm by 101.6 mm sample was fabricated in the laboratory. FIGS. 9A and 9B are two depictions of drop profile images captured during the contact angle measurements. The images depict a water droplet 40 on the outer layer 19. Both of them have the same CA of 154° and a ROA of below 2°. This step proves the scalability of the coating to be able to cover large area applications.

A design goal of the fabrication approach for the spray coated surface was ease of manufacturing, specifically targeting production cost, difficulty, and avoiding the use of hazardous chemicals. To cover a 1 ft² (929 cm²) surface area, the estimated material cost was $2.99, including $2.23 for the epoxy resin and $0.76 for the PTFE particle powder. For comparison, a sheet of PTFE for the same area would cost $4.10. [See Mulroney, A. T., Kessler, E. D., Combs, S. and Gupta, M. C., 2018. Low ice adhesion surfaces using microtextured hydrophobic tapes and their applications in refrigeration systems, *Surface and Coatings Technology*, 351, pp. 108-114, of which is hereby incorporated by reference herein in its entirety.] Additionally, the spray coating process used no hazardous chemicals at any stage.

In addition, the wetting performance of the spray-coated surfaces with liquids of different viscosities and surface tensions was studied and compared with unmodified plain surfaces. The CA and ROA of the fabricated surfaces with its respective test liquids are shown in Table 1. Results showed that a decrease in surface tension significantly affected the wettability of the surfaces: the contact angle decreases and the roll-off angle increases. When test liquids of surface tension go below 68 mN/m (water+50% glycerol), then the result will be a loss of superhydrophobicity, i.e., the contact angle becomes less than 150°, but the surface still holds the hydrophobicity. Then a complete spreading of the liquid on the surface happened as the surface tension of test liquids at 20 mN/m or lower (silicon oil). Compared with the unmodified plain epoxy resin surface, the spray-coated surface shows a large improvement on the wettability. Additionally, no viscosity effects on wettability were observed.

TABLE 1

Wetting performance of the PTFE spray coated surface with liquids of different viscosities and surface tension.

| | Viscosity [cP] | Surface Tension [mN/m] | Mean Contact Angle [°] | | Mean Roll-off Angle [°] | |
|---|---|---|---|---|---|---|
| | | | Plain Epoxy Resin | Spray-coated Surface | Plain Epoxy Resin | Spray-coated Surface |
| Water | 1.3 | 71.9 | 76.0 | 154.4 | Pinned | <2 |
| Water + 50% Glycerol | 6.0 | 68.6 | 71.7 | 146.8 | Pinned | <5 |
| Ethylene Glycol | 16.9 | 47.7 | 49.0 | 144.4 | Pinned | <10 |
| Silicon Oil | 100 | 20.9 | Spread | Spread | Spread | Spread |

Additional Examples

Example 1. A method of applying a coating to a substrate creating a hydrophobic or superhydrophobic surface, wherein said method comprises:
applying a polymer material or an adhesive material to said substrate creating a polymer coating layer having a top surface;
initially curing said applied coating layer for a specified amount of time allowing said coating layer to partially cure;
applying a solution, at a specified velocity, containing hydrophobic particles or superhydrophobic particles on top of said partially cured coating layer, wherein individual said hydrophobic particles or superhydrophobic particles are:
a) partially embedded into said partially cured coating layer while also being partially exposed above said top surface of said partially cured coating layer to form an outer layer,
b) fixedly disposed in contact with said top surface of said partially cured coating layer without being embedded within said partially cured coating layer to form said outer layer,
c) optionally, fixedly disposed in contact with said outer layers of 'a' and/or 'b' without being in contact with said partially cured coating layer to form said outer layer, and
d) optionally, entirely embedded in said partially cured coating layer apart from said outer layer; and
subsequently curing said substrate, said partially cured coating layer, and said outer layer, at a specified temperature for a specified period of time, wherein said outer layer exhibits hydrophobic properties or superhydrophobic properties.

Example 2. The method claim 1, wherein said hydrophobic particles are of the same material and said superhydrophobic particles are of the same material.

Example 3. The method claim 1 (as well as subject matter in whole or in part of example 2), wherein said hydrophobic particles are of different materials and said superhydrophobic particles are of different materials.

Example 4. The method claim 1 (as well as subject matter of one or more of any combination of examples 2-3, in whole or in part), wherein said polymer includes one or more of any of the following: resin or epoxy.

Example 5. The method claim 1 (as well as subject matter of one or more of any combination of examples 2-4, in whole or in part), wherein said adhesive material includes one or more of any of the following: foamed acrylic or cyanoacrylate.

Example 6. The method claim 1 (as well as subject matter of one or more of any combination of examples 2-5, in whole or in part), wherein said hydrophobic particles and said superhydrophobic particles include any one or more of the following:
PTFE, polypropylene, polyethylene, polyolefin, polydimethylsiloxane (PDMS), or fluorinated ethylene propylene (FEP).

Example 7. The method of claim 1 (as well as subject matter of one or more of any combination of examples 2-6, in whole or in part), wherein said solution comprises said hydrophobic particles or superhydrophobic particles and any one of the following solvents: acetone, methanol, hexane, or isopropanol.

Example 8. The method of claim 1 (as well as subject matter of one or more of any combination of examples 2-7, in whole or in part), wherein said hydrophobic or superhydrophobic particles exhibit a particle size having a mean diameter in one of the following:
a range of about 1 nm to about 25,000 nm;
a range of about 10 nm to about 15.000 nm;
a range of about 100 nm to about 10.000 nm; or
about 300 nm.

Example 9. The method as defined in claim 1 (as well as subject matter of one or more of any combination of examples 2-8, in whole or in part), wherein said solution comprises a weight fraction of fluoropolymer particles to acetone at one of or more of the following:
a range of about 0.1% to about 30%;
a range of about 1% to about 20%;
a range of about 5% to about 10%;
a range of about 10% to about 20%; or
about 5%.

Example 10. The method as defined in claim 1 (as well as subject matter of one or more of any combination of examples 2-9, in whole or in part), wherein said solution comprises a weight fraction of said hydrophobic particles or superhydrophobic particles to solvent at one of or more of the following:
a range of about 0.1% to about 30%;
a range of about 1% to about 20%;
a range of about 5% to about 10%;
a range of about 10% to about 20%; or
about 5%.

Example 11. The method of claim 10, wherein said solvent includes any one of the following: acetone, methanol, hexane, possibly or isopropanol.

Example 12. The method of claim 1 (as well as subject matter of one or more of any combination of examples 2-11, in whole or in part), wherein said initial curing includes any one or more of the following:

UV curing, plasma curing, thermal curing, ambient air curing, or chemical hardening, or a combination thereof.

Example 13 The method claim 1 (as well as subject matter of one or more of any combination of examples 2-12, in whole or in part), wherein said initial curing includes one or more of the following durations:
- a range of about 20 minutes to about 25 minutes;
- a range of about 1 nanosecond to about 1 hour;
- a range of about 1 hour to about 12 hours;
- a range of about 1 hour to about 24 hours; or
- a range of about 1 day to about 5 days.

Example 14. The method of claim 1 (as well as subject matter of one or more of any combination of examples 2-13, in whole or in part), wherein said solution is applied to said epoxy layer using an airbrush with a spray pressure that includes one or more of the following:
- about 10 kPa to about 1,000 kPa;
- about 100 kPa to about 500 kPa; or
- about 200 kPa.

Example 15. The method of claim 1 (as well as subject matter of one or more of any combination of examples 2-14, in whole or in part), wherein said subsequent curing includes any one or more of the following:
UV curing, plasma curing thermal curing, ambient air curing, or chemical hardening; or a combination thereof.

Example 16. The method as defined in claim 1 (as well as subject matter of one or more of any combination of examples 2-15, in whole or in part), wherein said subsequent curing temperature is at one of the following:
- a range of about 10° C. to about 45° C.;
- a range of about 10° C. to about 400° C.;
- a range of about 400° C. to about 750° C.;
- a range of about 10° C. to about 750° C.;
- a range of about −200° C. to about 400° C.;
- a range of about 100° C. to about 750° C.;
- a range of about 200° C. to about 500° C.;
- a range of about 300° C. to about 400° C.; or
- about 315° C.

Example 17. A method as defined in claim 1 (as well as subject matter of one or more of any combination of examples 2-16, in whole or in part), wherein after said subsequent curing, said substrate, said partially cured coating layer, said outer layer, and said embedded hydrophobic or superhydrophobic particles are cooled at ambient temperature for one of the following:
- a range of about 1 month to about six months;
- a range of about 4 hours to about 3 days;
- a range of about 1 nanosecond to about 1 hour;
- a range of about 1 minute to about 1 day;
- about 12 hours;
- about 24 hours; or
- about 2 days;
- about a month;
- about a year;

Example 18. The method as defined in claim 1 (as well as subject matter of one or more of any combination of examples 2-17, in whole or in part), wherein said hydrophobic outer layer or superhydrophobic outer layer exhibits peak-valley difference at about one of the following:
- a range of about 1 nm to about 300,000 nm;
- a range of about 1,000 nm to about 300,000 nm;
- a range of about 1 nm to about 50,000 nm;
- a range of about 1,000 nm to about 300,000 nm;
- a range of about 10,000 nm to about 200,000 nm;
- a range of about 50,000 nm to about 100,000 nm; or
- about 39,000 nm.

Example 19. The method of claim 1 (as well as subject matter of one or more of any combination of examples 2-18, in whole or in part), wherein said hydrophobic outer layer or superhydrophobic outer layer is one of the following:
- an outer surface of an aircraft wing wherein said substrate is an aircraft wing component;
- an outer surface of a turbine blade wherein said substrate is a turbine blade component;
- an outer surface of a cooling or heating system blade wherein said substrate is a cooling or heating system blade component;
- an outer surface of a cooling or heating system coil wherein said substrate is a cooling or heating system coil component;
- an outer surface of a wind turbine wherein said substrate is a wind turbine component;
- an outer surface of a solar panel wherein said substrate is a solar panel component; or
- an outer surface of a window wherein said substrate is a window component.

Example 20. The method as defined in claim 1, further comprising removing a specified amount of said individual said hydrophobic particles or superhydrophobic particles including one or more of the following:
- said hydrophobic particles or superhydrophobic particles of 'a';
- said hydrophobic particles or superhydrophobic particles of 'b'; or
- optionally, said hydrophobic particles or superhydrophobic particles of 'c'.

Example 21. A composition configured to be disposed on a substrate, wherein said composition comprises:
- a coating layer disposed on said substrate comprised of a polymer material or adhesive material, wherein said coating includes a top surface;
- an outer layer disposed on said coating layer;
- wherein said outer layer comprises substantially uniform distributed hydrophobic particles or superhydrophobic particles; and
- wherein said individual said hydrophobic particles or superhydrophobic particles are:
  a) partially embedded into said partially cured coating layer while also being partially exposed above said top surface of said partially cured coating layer to form said outer layer,
  b) fixedly disposed in contact with said top surface of said partially cured coating layer without being embedded within said partially cured coating to form said outer layer,
  c) optionally, fixedly disposed in contact with said outer layers of 'a' and/or 'b' without being in contact with said partially cured coating layer to form said outer layer, and
  d) optionally, entirely embedded in said partially cured coating layer apart from said outer layer; and
- wherein said outer layer exhibits hydrophobic properties or superhydrophobic properties.

Example 22. The composition of claim 21, wherein said hydrophobic particles are of the same material and said superhydrophobic particles are of the same material.

Example 23. The composition of claim 21 (as well as subject matter in whole or in part of example 21), wherein said hydrophobic particles are of different materials and said superhydrophobic particles are of different materials.

Example 24. The composition of claim 21 (as well as subject matter of one or more of any combination of examples 22-23, in whole or in part), wherein said polymer includes one or more of any of the following: resin, epoxy, or fiberglass.

Example 25. The composition of claim 21 (as well as subject matter of one or more of any combination of examples 22-24, in whole or in part), wherein said adhesive material includes one or more of any of the following: foamed acrylic or cyanoacrylate.

Example 26. The composition of claim 21 (as well as subject matter of one or more of any combination of examples 22-25, in whole or in part), wherein said hydrophobic particles and said superhydrophobic particles include any one or more of the following:

PTFE, polypropylene, polyethylene, polyolefin, polydimethylsiloxane (PDMS), or fluorinated ethylene propylene (FEP).

Example 27. The composition of claim 21 (as well as subject matter of one or more of any combination of examples 22-26, in whole or in part), wherein said hydrophobic or superhydrophobic particles exhibit a particle size having a mean diameter in one of the following:
a range of about 1 nm to about 25,000 nm;
a range of about 10 nm to about 15,000 nm;
a range of about 100 nm to about 10,000 nm; or
about 300 nm.

Example 28. The composition as defined in claim 21 (as well as subject matter of one or more of any combination of examples 22-27, in whole or in part), wherein said hydrophobic outer layer or superhydrophobic outer layer exhibits peak-valley difference at about one of the following:
a range of about 1 nm to about 300,000 nm;
a range of about 1,000 nm to about 300,000 nm;
a range of about 1 nm to about 50,000 nm;
a range of about 1,000 nm to about 300,000 nm;
a range of about 10,000 nm to about 200,000 nm;
a range of about 50,000 nm to about 100,000 nm; or
about 39,000 nm.

Example 29. The composition of claim 21 (as well as subject matter of one or more of any combination of examples 22-28, in whole or in part), wherein said hydrophobic outer layer or superhydrophobic outer layer is one of the following:
an outer surface of an aircraft wing wherein said substrate is an aircraft wing component;
an outer surface of a turbine blade wherein said substrate is a turbine blade component;
an outer surface of a cooling or heating system blade wherein said substrate is a cooling or heating system blade component;
an outer surface of a cooling or heating system coil wherein said substrate is a cooling or heating system coil component;
an outer surface of a wind turbine wherein said substrate is a wind turbine component;
an outer surface of a solar panel wherein said substrate is a solar panel component; or
an outer surface of a window wherein said substrate is a window component.

Example 30. A method of manufacturing any one or more of the compositions in any one or more of Examples 21-29.

Example 31. A method of using any one or more of the compositions in any one or more of Examples 21-29.

Example 32. An article of manufacture produced by any one or more of the methods in any one or more of Examples 1-20.

Example 33. A system configured for applying the methods in any one or more of Examples 1-20.

Example 34. A method of applying a coating to a substrate creating a hydrophobic or superhydrophobic surface, wherein said method comprises:
applying a polymer material or an adhesive material to said substrate creating a polymer coating layer having a top surface;
initially curing said applied coating layer for a specified amount of time allowing said coating layer to partially cure;
applying a solution, at a specified velocity, containing hydrophobic particles or superhydrophobic particles on top of said partially cured coating layer, wherein individual said hydrophobic particles or superhydrophobic particles are:
a) partially embedded into said partially cured coating layer while also being partially exposed above said top surface of said partially cured coating layer to form an outer layer,
b) fixedly disposed in contact with said top surface of said partially cured coating layer without being embedded within said partially cured coating layer to form said outer layer,
c) fixedly disposed in contact with said outer layers of 'a' and 'b' without being in contact with said partially cured coating layer to form said outer layer, and
d) entirely embedded in said partially cured coating layer apart from said outer layer; and
subsequently curing said substrate, said partially cured coating layer, and said outer layer, at a specified temperature for a specified period of time, wherein said outer layer exhibits hydrophobic properties or superhydrophobic properties.

Example 35. A composition configured to be disposed on a substrate, wherein said composition comprises:
a coating layer disposed on said substrate comprised of a polymer material or adhesive material, wherein said coating includes a top surface;
an outer layer disposed on said coating layer;
wherein said outer layer comprises substantially uniform distributed hydrophobic particles or superhydrophobic particles; and
wherein said individual said hydrophobic particles or superhydrophobic particles are:
a) partially embedded into said partially cured coating layer while also being partially exposed above said top surface of said partially cured coating layer to form said outer layer,
b) fixedly disposed in contact with said top surface of said partially cured coating layer without being embedded within said partially cured coating to form said outer layer,
c) fixedly disposed in contact with said outer layers of 'a' and 'b' without being in contact with said partially cured coating layer to form said outer layer, and
d) entirely embedded in said partially cured coating layer apart from said outer layer; and
wherein said outer layer exhibits hydrophobic properties or superhydrophobic properties.

REFERENCES

The devices, systems, apparatuses, modules, compositions, materials, computer program products, non-transitory computer readable medium, and methods of various embodiments of the invention disclosed herein may utilize aspects (such as devices, apparatuses, modules, systems, compositions, materials, computer program products, non-transitory computer readable medium, and methods) disclosed in the following references, applications, publications and patents and which are hereby incorporated by reference herein in their entirety (and which are not admitted to be prior art with respect to the present invention by inclusion in this section).

1. U.S. Utility patent application Ser. No. 14/824,060, entitled "METHOD OF FORMING A SPECTRAL SELECTIVE COATING", filed Aug. 11, 2015; U.S. Pat. No. 10,201,947, issued Feb. 12, 2019.
2. U.S. Utility patent application Ser. No. 14/291,585, entitled "Systems and Methods of Laser Texturing and Crystallization of Material Surfaces", filed May 30, 2014; Publication No. 2014/0273535, Sep. 18, 2014.
3. U.S. Utility patent application Ser. No. 12/158,553, entitled "Systems and Methods of Laser Texturing and Crystallization of Material Surfaces", filed Jun. 20, 2008; U.S. Pat. No. 8,753,990, issued Jun. 17, 2014.
4. International Patent Application Serial No. PCT/US2006/049065, entitled "Systems and Methods of Laser Texturing and Crystallization of Material Surfaces", filed Dec. 21, 2006; Publication No. WO 2008/091242, Jul. 31, 2008.
5. U.S. Utility patent application Ser. No. 13/628,009, entitled "SYSTEMS AND METHODS OF LASER TEXTURING OF MATERIAL SURFACES AND THEIR APPLICATIONS", filed Sep. 26, 2012; U.S. Pat. No. 8,846,551, issued Sep. 30, 2014.
6. U.S. Utility patent application Ser. No. 13/536,695, entitled "Micro-Structure and Nano-Structure Replication Methods and Article of Manufacture", filed Jun. 28, 2012; U.S. Pat. No. 10,131,086, issued Nov. 20, 2018.
7. U.S. Utility patent application Ser. No. 12/530,313, entitled "Systems and Methods of Laser Texturing of Material Surfaces and their Applications", filed Sep. 8, 2009; Publication No. 2010/0143744, Jun. 10, 2010.
8. International Patent Application Serial No. PCT/US2008/056033, entitled "Systems and Methods of Laser Texturing of Material Surfaces and their Applications", filed Mar. 6, 2008; Publication No. WO 2008/127807, Oct. 23, 2008.
9. U.S. Utility patent application Ser. No. 12/098,000, entitled "Conducting Nanotubes or Nanostructures Based Composites, Method of Making Them and Applications", filed Jun. 18, 2008; U.S. Pat. No. 8,424,200, issued Apr. 23, 2013.
10. International Patent Application Serial No. PCT/US2006/048165, entitled "Conducting Nanotubes or Nanostructures Based Composites, Method of Making Them and Applications", filed Dec. 19, 2006; Publication No. WO2008/045109, Apr. 17, 2008.
11. U.S. Pat. No. 7,434,793 B2, Kunath, et al., "Coating for a Throttle Body", Oct. 14, 2008.
12. U.S. Patent Application Publication No. US 2020/0181427 A1, Nowak, et al., "Compositions and Methods for Fabricating Durable, Low-Ice-Adhesion Coatings", Jun. 11, 2020.
13. U.S. Pat. No. 10,619,057 B2, Nowak, et al., "Compositions and Methods for Fabricating Durable, Low-Ice-Adhesion Coatings", Apr. 14, 2020.
14. U.S. Patent Application Publication No. US 2019/0023830 A1, Nowak, et al., "Compositions for Fabricating Durable, Low-Ice-Adhesion Coatings", Jan. 24, 2019.
15. U.S. Patent Application Publication No. US 2019/0176188 A1, Rodriguez, et al., "Methods for Fabricating Transparent Icephobic Coatings, and Transparent Icephobic Coatings Obtained Therefrom", Jun. 13, 2019.
16. Mulroney A T, Kessler E D, Combs S, Gupta M C, "Low Ice Adhesion Surfaces Using Microtextured Hydrophobic Tapes and Their Applications in Refrigeration Systems", Surface & Coatings Technology. 2018; 351: 108-114. https://doi.org/10.1016/j.surfcoat.2018.07.060.
17. Qin C, Mulroney A T, Gupta M C, "Anti-Icing Epoxy Resin Surface Modified by Spray Coating of PTFE Teflon Particles for Wind Turbine Blades", Materials Today Communications. 2019; 22: 100770. https://doi.org/10.1016/j.mtcomm.2019.100770.
18. European Patent No. EP 1 849 843 B1, Watson, et al., "Erosion Resistant Anti-Icing Coatings", Sep. 30, 2015.
19. U.S. Pat. No. 4,032,090, Thornton-Trump, "Method for Deicing Aircraft", Jun. 28, 1977.
20. European Patent No. EP 2 632 612 B1, Zhang, et al., "Superhydrophobic Films", May 25, 2016.
21. U.S. Pat. No. 10,584,260 B2, Nowak, et al., "Coatings, Coating Compositions, and Methods of Delaying Ice Formation", Mar. 10, 2020.
22. U.S. Pat. No. 9,637,658 B2, Nowak, et al., "Coatings, Coating Compositions, and Methods of Delaying Ice Formation", May 2, 2017.
23. Mulroney, A. T., Kessler, E. D., Combs, S. and Gupta, M. C., 2018, Low ice adhesion surfaces using microtextured hydrophobic tapes and their applications in refrigeration systems, *Surface and Coatings Technology*, 351, pp. 108-114.
24. Yang, S., Xia, Q., Zhu, L., Xue, J., Wang, Q. and Chen, Q. M., 2011, Research on the icephobic properties of fluoropolymer-based materials, *Applied Surface Science*, 257(11), pp. 4956-4962.
25. Caffrey, P. O. and Gupta, M. C., 2014. Electrically conducting superhydrophobic microtextured carbon nanotube nanocomposite., *Applied Surface Science*, 314, pp. 40-45.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. Method of applying a coating to a substrate creating a hydrophobic or superhydrophobic surface, said method comprising:
    applying a polymer material or an adhesive material to said substrate creating a polymer coating layer having a top surface;
    initially curing said applied coating layer for a specified amount of time allowing said coating layer to partially cure;
    applying a solution, at a specified velocity, containing hydrophobic particles or superhydrophobic particles on top of said partially cured coating layer, wherein individual said hydrophobic particles or superhydrophobic particles are:
        a) partially embedded into said partially cured coating layer while also being partially exposed above said top surface of said partially cured coating layer to form an outer layer,
        b) fixedly disposed in contact with said top surface of said partially cured coating layer without being embedded within said partially cured coating layer to form said outer layer,
        c) fixedly disposed in contact with said outer layers of 'a' and 'b' without being in contact with said partially cured coating layer to form said outer layer, and
        d) entirely embedded in said partially cured coating layer apart from said outer layer; and
    subsequently curing said substrate, said partially cured coating layer, and said outer layer, at a specified temperature for a specified period of time, wherein said outer layer exhibits hydrophobic properties or superhydrophobic properties.

2. The method of claim 1, wherein said hydrophobic particles are of the same material and said superhydrophobic particles are of the same material.

3. The method of claim 1, wherein said hydrophobic particles are of different materials and said superhydrophobic particles are of different materials.

4. The method of claim 1, wherein said polymer material includes one or more of any of the following: resin or epoxy.

5. The method of claim 1, wherein said adhesive material includes one or more of any of the following: foamed acrylic or cyanoacrylate.

6. The method of claim 1, wherein said hydrophobic particles and said superhydrophobic particles include any one or more of the following:
    PTFE, polypropylene, polyethylene, polyolefin, polydimethylsiloxane (PDMS), or fluorinated ethylene propylene (FEP).

7. The method of claim 1, wherein said solution comprises said hydrophobic particles or superhydrophobic particles and any one of the following solvents:
    acetone, methanol, hexane, or isopropanol.

8. The method of claim 1, wherein said hydrophobic or superhydrophobic particles exhibit a particle size having a mean diameter in one of the following:
    a range of about 1 nm to about 25,000 nm,
    a range of about 10 nm to about 15,000 nm;
    a range of about 100 nm to about 10,000 nm; or
    about 300 nm.

9. The method as defined in claim 1, wherein said solution comprises fluoropolymer particles and acetone particles wherein said solution has a weight fraction of said fluoropolymer particles to said acetone particles at one of the following:
    a range of about 0.1% to about 30%;
    a range of about 1% to about 20%,
    a range of about 5% to about 10%,
    a range of about 10% to about 20%; or
    about 5%.

10. The method as defined in claim 1, wherein said solution further comprises a solvent wherein said solution has a weight fraction of said hydrophobic particles or said superhydrophobic particles to said solvent at one of the following:
    a range of about 0.1% to about 30%;
    a range of about 1% to about 20%,
    a range of about 5% to about 10%;
    a range of about 10% to about 201%; or
    about 5%.

11. The method of claim 10, wherein said solvent includes one of the following: acetone, methanol, hexane, possibly or isopropanol.

12. The method of claim 1, wherein said initial curing includes any one or more of the following:
    UV curing, plasma curing, thermal curing, ambient air curing, or chemical hardening, or a combination thereof.

13. The method of claim 1, wherein said initial curing includes one of the following durations:
    a range of about 20 minutes to about 25 minutes;
    a range of about 1 nanosecond to about 1 hour,
    a range of about 1 hour to about 12 hours;
    a range of about 1 hour to about 24 hours, or
    a range of about 1 day to about 5 days.

14. The method of claim 1, wherein said solution is applied to said epoxy layer using an airbrush with a spray pressure that includes one of the following:
    about 10 kPa to about 1.000 kPa;
    about 100 kPa to about 500 kPa; or
    about 200 kPa.

15. The method of claim 1, wherein said subsequent curing includes any one or more of the following:
    UV curing, plasma curing thermal curing, ambient air curing, or chemical hardening; or a combination thereof.

16. The method as defined in claim 1, wherein said subsequent curing temperature is at one of the following:
- a range of about 10° C. to about 45° C.;
- a range of about 10° C. to about 400° C.;
- a range of about 400° C. to about 750° C.;
- a range of about 10° C. to about 750° C.;
- a range of about −200° C. to about 400° C.;
- a range of about 100° C. to about 750° C.;
- a range of about 200° C. to about 500° C.;
- a range of about 300° C. to about 400° C.; or
- about 315° C.

17. A method as defined in claim 1, wherein after said subsequent curing, said substrate, said partially cured coating layer, said outer layer, and said embedded hydrophobic or superhydrophobic particles are cooled at ambient temperature for one of the following:
- a range of about 1 month to about six months;
- a range of about 4 hours to about 3 days;
- a range of about 1 nanosecond to about 1 hour;
- a range of about 1 minute to about 1 day,
- about 12 hours;
- about 24 hours; or
- about 2 days;
- about a month;
- about a year.

18. The method as defined in claim 1, wherein said hydrophobic outer layer or superhydrophobic outer layer exhibits peak-valley difference at one of the following:
- a range of about 1 nm to about 300,000 nm;
- a range of about 1,000 nm to about 300,000 nm;
- a range of about 1 nm to about 50,000 nm;
- a range of about 1,000 nm to about 300,000 nm;
- a range of about 10,000 nm to about 200,000 nm;
- a range of about 50.000 nm to about 100,000 nm; or
- about 39,000 nm.

19. The method of claim 1, wherein said hydrophobic outer layer or superhydrophobic outer layer is one of the following:
- an outer surface of an aircraft wing wherein said substrate is an aircraft wing component;
- an outer surface of a turbine blade wherein said substrate is a turbine blade component;
- an outer surface of a cooling or heating system blade wherein said substrate is a cooling or heating system blade component;
- an outer surface of a cooling or heating system coil wherein said substrate is a cooling or heating system coil component;
- an outer surface of a wind turbine wherein said substrate is a wind turbine component;
- an outer surface of a solar panel wherein said substrate is a solar panel component; or
- an outer surface of a window wherein said substrate is a window component.

20. The method as defined in claim 1, further comprising removing a specified amount of said individual mid hydrophobic particles or superhydrophobic particles including one or more of the following:
- said hydrophobic particles or superhydrophobic particles of 'a';
- said hydrophobic particles or superhydrophobic particles of 'b'; or
- said hydrophobic particles or superhydrophobic particles of 'c'.

* * * * *